US 8,020,576 B2

(12) United States Patent
Lauber et al.

(10) Patent No.: US 8,020,576 B2
(45) Date of Patent: *Sep. 20, 2011

(54) EMERGENCY SHUTOFF VALVE FOR USE IN A FUEL DISPENSING SYSTEM

(75) Inventors: Matthew R. Lauber, Cincinnati, OH (US); James E. Kesterman, Cincinnati, OH (US)

(73) Assignee: Delaware Capital Formation, Inc., Wilmington, DE (US)

( * ) Notice: Subject to any disclaimer, the term of this patent is extended or adjusted under 35 U.S.C. 154(b) by 1056 days.

This patent is subject to a terminal disclaimer.

(21) Appl. No.: 11/688,509

(22) Filed: Mar. 20, 2007

(65) Prior Publication Data
US 2008/0099704 A1 May 1, 2008

Related U.S. Application Data

(63) Continuation-in-part of application No. 11/553,067, filed on Oct. 26, 2006, now Pat. No. 7,578,308.

(51) Int. Cl.
*F16K 17/14* (2006.01)
(52) U.S. Cl. .................. 137/68.14; 285/4
(58) Field of Classification Search .......... 137/15.11, 137/67, 68.11, 68.14, 314, 614, 797, 70, 137/71, 312; 285/4; 138/30, 104
See application file for complete search history.

(56) References Cited

U.S. PATENT DOCUMENTS

| | | | |
|---|---|---|---|
| 3,489,160 A | 1/1970 | Moore | |
| 3,606,900 A | 9/1971 | Wunderlich | |
| 3,618,626 A * | 11/1971 | Russo | 137/68.14 |
| 3,630,214 A | 12/1971 | Levering | |
| 3,709,240 A | 1/1973 | Milo | |
| 3,719,194 A | 3/1973 | Anderson et al. | |
| 3,750,688 A * | 8/1973 | Hall et al. | 137/2 |
| 3,782,401 A | 1/1974 | Moore et al. | |
| 3,811,456 A | 5/1974 | Nelson | |
| 3,860,024 A | 1/1975 | Turley | |

(Continued)

FOREIGN PATENT DOCUMENTS

JP 55 68527 5/1980

OTHER PUBLICATIONS

Search Report issued in related European Patent Application No. EP07254118.1; Feb. 1, 2008; 7 pages; European Patent Office.

(Continued)

*Primary Examiner* — Craig Schneider
(74) *Attorney, Agent, or Firm* — Wood, Herron & Evans, L.L.P.

(57) ABSTRACT

An emergency shutoff valve is provided that includes a housing defining a fluid inlet, a fluid outlet and a fluid flow passage extending therebetween. The valve includes a valve element disposed within the housing and releasably latched in an open position by a latching mechanism. An expansible member defines at least a portion of a sealed expansible chamber that is sealed at locations downstream and upstream of a weakened portion of the housing. The valve includes an access port in fluid communication with the chamber. The access port may be used to test the integrity of the expansible member. An expandable material may also be disposed in the chamber and used to shut off the valve on the occasion the housing is compromised to an extent wherein fuel can flow into the expansible chamber.

15 Claims, 13 Drawing Sheets

U.S. PATENT DOCUMENTS

| | | | |
|---|---|---|---|
| 3,860,025 A | | 1/1975 | Nelson |
| 3,913,603 A | | 10/1975 | Torres |
| 3,956,604 A | * | 5/1976 | Larker et al. ............... 200/61.08 |
| 4,023,584 A | | 5/1977 | Rogers et al. |
| 4,090,524 A | | 5/1978 | Allread et al. |
| 4,131,142 A | | 12/1978 | Barr et al. |
| 4,307,744 A | | 12/1981 | Marrison |
| 4,389,877 A | * | 6/1983 | Lacey ................. 73/37 |
| 4,625,746 A | | 12/1986 | Calvin et al. |
| 4,896,688 A | | 1/1990 | Richards et al. |
| 4,898,199 A | | 2/1990 | Morris et al. |
| 4,899,786 A | | 2/1990 | Morris et al. |
| 5,099,870 A | | 3/1992 | Moore et al. |
| 5,099,894 A | | 3/1992 | Mozeley, Jr. |
| 5,193,569 A | | 3/1993 | Moore et al. |
| 5,244,006 A | | 9/1993 | Pettesch |
| 5,305,798 A | * | 4/1994 | Driver ............... 138/98 |
| 5,351,708 A | | 10/1994 | Donato et al. |
| 5,454,394 A | | 10/1995 | Moore et al. |
| 5,765,587 A | | 6/1998 | Osborne |
| 6,112,758 A | | 9/2000 | Wooten |
| 6,209,569 B1 | | 4/2001 | Sharp |
| 6,244,288 B1 | | 6/2001 | Pettesch |
| 6,363,962 B1 | | 4/2002 | Geisinger |
| 6,802,332 B1 | | 10/2004 | Stuart |
| 6,913,046 B2 | | 7/2005 | Hutchinson et al. |
| 6,938,636 B1 | | 9/2005 | Nimberger |
| 2004/0052689 A1 | * | 3/2004 | Yao ............... 422/100 |
| 2004/0123899 A1 | | 7/2004 | Turvey |
| 2005/0224114 A1 | | 10/2005 | Cook et al. |
| 2006/0191568 A1 | | 8/2006 | Bolt et al. |
| 2006/0191569 A1 | | 8/2006 | Bolt et al. |

OTHER PUBLICATIONS

Eurasian Patent Office, Search Report, 2 pages, Jul. 17, 2008.

Frank Wartenhorst; European Search Report issued in related European Patent Application No. 10194911.3; Feb. 11, 2011; 2 pages; European Patent Office.

Frank Wartenhorst; European Examination Report issued in related European Patent Application No. 07254188.1; Feb. 28, 2011; 5 pages; European Patent Office.

* cited by examiner

EMERGENCY SHUTOFF VALVE FOR USE IN A FUEL DISPENSING SYSTEM

CROSS-REFERENCE TO RELATED APPLICATIONS

This application is a continuation in part of U.S. application Ser. No. 11/553,067 filed on Oct. 26, 2006, now U.S. Pat. No. 7,578,308, the disclosure of which is expressly incorporated by reference herein in its entirety.

FIELD OF THE INVENTION

The present invention relates generally to valves, and more particularly to emergency shutoff valves for use in fuel dispensing systems.

BACKGROUND

Fuel dispensing systems used at retail gas stations typically include an underground tank containing gasoline, diesel fuel or other liquid fuels, an above ground dispensing unit terminating in a nozzle adapted to supply the fuel to a motor vehicle, and a piping system interconnecting the underground tank and dispensing unit. While infrequent, vehicles can collide with the dispensing unit, causing the dispensing unit to be displaced. It is also possible for the unit to be displaced due to certain environmental conditions. In either event, a fuel pipe or conduit may rupture, causing fuel to be spilled and creating a potentially hazardous condition, unless preventive measures are taken.

A variety of emergency fuel shutoff valves are known in the art that have been developed in response to the foregoing potential problem. Known valves of this type include those having upper and lower housings releasably connected to one another, with the lower housing rigidly mounted. For instance, the lower housing can be mounted within a sump located beneath a concrete pedestal supporting the dispensing unit using, for example, a mounting bar as is known in the art. The lower housing is operably connected to the underground tank via underground conduits, while the upper housing is operably connected to the fuel dispensing unit.

A weakened portion, such as a circumferential groove, formed in the upper housing provides a planned failure site so that a first portion of the valve can separate from a second portion of the valve when one of the first or second portions is subjected to a predetermined load. Such a separation of valve portions causes a valve element in the lower housing to move from a releasably latched open position to a closed position, shutting off the flow of fuel from the underground tank. Shutoff valves of this type may also include a check valve in the upper housing that closes under the action of a biasing member when the valve portions separate. The check valve may reduce or prevent the backflow of fuel from the dispensing unit.

Emergency shutoff valves of the foregoing type have been successfully used in fuel dispensing systems, but they can exhibit certain disadvantages. For instance, it is possible even though highly unlikely for the dispensing unit to be subjected with a load or force that is not sufficient for the first portion of the shutoff valve to be separated from the second portion of the valve, but is sufficient to compromise the structural integrity of the valve housing. In other words, a load may in a very unusual situation crack the valve housing along the groove without completely separating the valve portions on either side of the groove. In this event, the valve element in the lower housing may not close, which may permit fuel to escape from the housing through the cracked or otherwise damaged weakened portion of the valve, resulting in undesirable spillage of fuel to the environment.

It is therefore desirable to provide an emergency shutoff valve for use in fuel dispensing systems that overcomes the disadvantages associated with known emergency shutoff valves.

SUMMARY

To these ends, an embodiment of the invention contemplates an emergency shutoff valve having a frangible, or weakened portion or other form of predetermined failure area disposed within or forming a portion of an expansible chamber. Any leak from this frangible area, such as might occur from an impact to a fuel dispenser or due to certain environmental conditions, actuates a movable member which defines at least a portion of an expansible chamber, and this movement is operatively coupled to the valve so as to cause it to shut off. Accordingly, fuel leaks from impact or valve trauma less than full valve compromise, i.e., cracking the valve without fully shearing or separating the valve, may be contained or reduced through valve shut off.

More particularly, an emergency shutoff valve according to one embodiment of the invention is provided for use in a fuel dispensing system. The emergency shutoff valve comprises a housing defining a fluid inlet, a fluid outlet and a fluid flow passage extending between the fluid inlet and the fluid outlet. The flow passage may be suitable for the flow of fuel therein. The valve may further include a valve element movable within the housing between an open position, in which fuel is permitted to flow between the fluid inlet and outlet, and a closed position, in which fuel is prevented from flowing between the fluid inlet to the fluid outlet. A latching mechanism may be coupled to the valve element and the housing to releasably latch the valve element in the open position. The valve may also include an expansible member defining at least a portion of a sealed expansible chamber external of the housing. The housing comprises a weakened portion downstream of the valve element and the expansible chamber is sealed to the housing at a first location upstream of the weakened portion and at a second location downstream of the weakened portion so as to bound or enclose the weakened portion. The emergency shutoff valve defines a failure mode wherein the structural integrity of the housing is compromised to an extent wherein fuel may escape from the housing through a crack in the weakened portion and into the expansible chamber when a predetermined load is applied to the housing. Upon occurrence of the failure mode, the expansible member is operable for uncoupling the latching mechanism from at least one of the housing and the valve element, wherein the valve element moves from the open position to the closed position to stop the flow of fuel through the valve. In particular, the pressure in the fuel line causes fuel to flow into the expansion chamber through the crack in the weakened portion of the housing so as to actuate the expansible member thereby causing the valve element to move to the closed position.

In other embodiments, the emergency fuel shutoff valve may include one or more of the following features. In some embodiments, the expansible member may comprise a sleeve, made of an elastomeric material, disposed in surrounding relationship with the housing. The valve further may include a rotatable shaft having one end projecting outwardly from the housing, with the valve element being coupled to the shaft for rotation therewith. A biasing member cooperates with the shaft to bias the valve element toward the closed position.

The latching mechanism may be a linkage. In one embodiment, the linkage includes first and second links, each having proximal and distal ends, with the proximal end of the first link being coupled to the housing and the distal end of the first link being coupled to the proximal end of the second link. The distal end of the second link may be coupled to the end of the rotatable shaft that projects outwardly from the housing. In this embodiment, the expansible member is operable for contacting and moving the first link upon occurrence of the failure mode, wherein the first link is uncoupled from one of the housing and the second link, and wherein the valve element is unlatched and moves from the open position to the closed position. The first link may include a protruding portion disposed between the proximal and distal ends of the first link and protruding toward the expansible member.

Alternatively, the first link may include a first link portion and a second link portion each pivotally coupled to the housing. The first link portion may include a notch and the second link portion may include a first, second and third arm. The proximal end of the second link may include a pin that is received in the notch of the first link portion when the valve element is releasably latched in the open position. The distal end of the second link may be coupled to the end of the rotatable shaft that projects outwardly from the housing. The second arm of the second link portion may extend generally tangentially relative to the housing proximate the expansible member. In this embodiment, the expansible member is operable, upon occurrence of the failure mode, for contacting the second arm, causing the first link to rotate and the pin to become disengaged from the notch in the first link portion, wherein the valve element is unlatched from the open position and moves to the closed position.

In another embodiment, the valve may further comprise an annular member at least partially circumscribing the housing and a hollow protruding member integral with the annular member and extending away from the housing. In this embodiment, the expansible member may comprise a diaphragm made of an elastomeric material and the expansible member can be disposed in sealing engagement with the protruding member. The linkage may comprise first and second links coupled to one another. The first link may be coupled to the housing at its proximal end and coupled to the proximal end of the second link at its distal end. The distal end of the second link may be coupled to the end of the rotatable shaft that projects outwardly from the housing. In this embodiment, the expansible member is operable for contacting and moving the first link upon occurrence of the failure mode wherein the first link is uncoupled from one of the housing and the second link, and the valve element is unlatched and moves from the open position to the closed position.

The weakened portion of the housing may take a variety of forms. In one embodiment, it is a circumferential groove. At least a portion of the groove can be generally V-shaped. The expansible member may be made of any suitable material, including those selected from the group consisting of fluro silicone rubber, BUNA-N rubber, fluro elastomer rubber or other suitable materials.

The housing preferably includes a lower housing and an upper housing secured to one another, with the lower housing adapted to be mounted within a sump beneath a dispensing unit and further adapted to be operatively coupled to a source of pressurized fuel. The upper housing preferably includes the weakened portion and may be adapted to be coupled to a fuel pipe within the dispensing unit. The valve element is preferably disposed within the lower housing, upstream of the weakened or frangible portion of the valve.

The emergency shutoff valve may further include a normally open, second valve element disposed within the upper housing and a biasing member biasing the second valve element toward a closed position.

The embodiments of the shutoff valve may include an access port having an inlet, outlet, and an open channel extending therebetween. The outlet is in fluid communication with the expansible chamber. Such an access port may be used to test the integrity of the expansible member. The access port may further provide some advantages during assembly of the shutoff valves.

Furthermore, embodiments of the shutoff valve include an expandable material disposed in the expansible chamber. The expandable material has a first volume when dry but expands to a second volume greater than the first volume when it comes into contact with a liquid, such as fuel. The expandable material may be used alone or in combination with the fluid conduit line pressure as the motive force for shutting the valve on the occasion of leaking fuel.

According to another aspect of the invention, a method is provided for isolating a leak in a fuel dispensing system. The method comprises providing an emergency shutoff valve for use in the fuel dispensing system, with the valve comprising a housing with a weakened portion therein, and the housing defining a fluid inlet, a fluid outlet and a fluid flow passage therebetween. The valve further comprises a valve element movable between an open position and a closed position. The method further comprises providing a linkage coupled to the valve element and the housing, wherein the linkage releasably latches the valve element in the open position. Additionally, the method comprises defining at least a portion of an expansible chamber with an expansible member sealed to the housing at locations upstream and downstream of the weakened portion, wherein the expansible member is operable, upon occurrence of a fuel leak from the fluid flow passage through the weakened portion and into the expansible chamber, for uncoupling the linkage from at least one of the housing and the valve element, wherein the valve element is unlatched and moves from the open position to the closed position to stop the flow of fuel through the valve.

Stated in another way, the method comprises the steps of defining a frangible area in a fluid conduit downstream of a cut-off valve, and disposed within an expansible chamber sealed to the conduit downstream and upstream of the frangible area, and closing the valve upon movement of an expansible member forming at least a portion of the expansible chamber in response to leakage of the fluid through the frangible area. In one aspect of the invention, the pressure in the fuel line is sufficient to actuate the expansible member so as to close the valve when a leak occurs along the weakened or frangible area.

A method is also provided for testing an emergency shutoff valve by providing a valve having a housing with a weakened portion therein, an expansible member at least partially surrounding the weakened portion to define an expansible chamber therebetween, and an access port in fluid communication with the expansible chamber. The method further comprises pressurizing the expansible chamber and monitoring the pressure therein. If the pressure changes more than a specified threshold value, then the expansible member may be changed.

Yet another method is provided for shutting off fuel through a conduit defining a frangible area therein and includes defining a chamber about the frangible area with an expansible member forming at least a portion of the chamber, disposing an expandable material in the chamber, and using the expansion of the expandable material to shut off fuel flow through the conduit.

BRIEF DESCRIPTION OF THE DRAWINGS

These and other features, aspects and advantages of the present invention will become better understood with regard to the following description, appended claims and accompanying drawings wherein:

DETAILED DESCRIPTION

Figure 1:
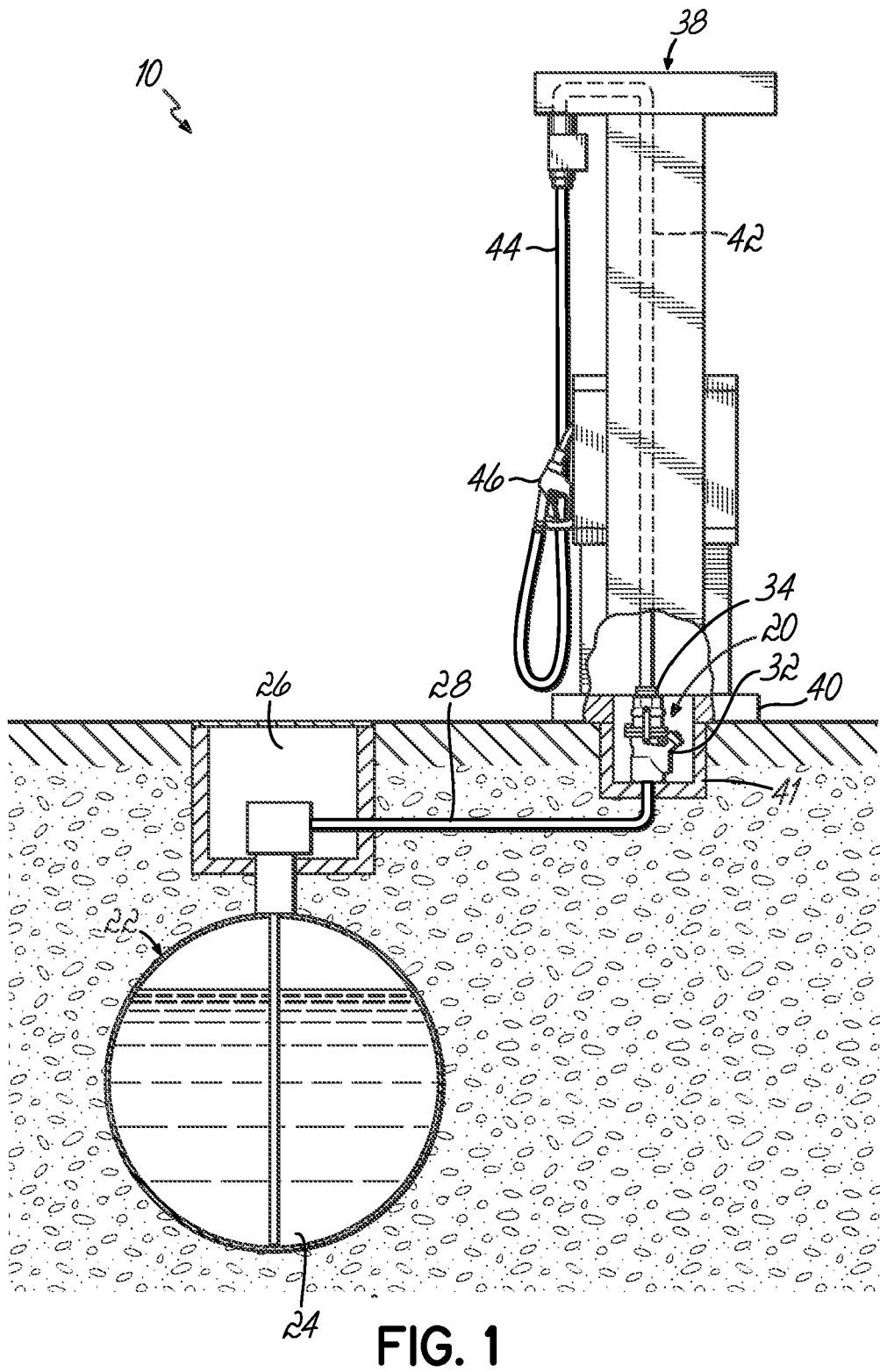
FIG. 1 is a schematic illustration of a fuel dispensing system that incorporates an emergency shutoff valve according to an embodiment of the present invention.

FIG. 1 is a schematic illustration of a fuel dispensing system 10 that incorporates an emergency shutoff valve 20 according to the present invention. The fuel dispensing system 10 includes a source of fuel 22 having fuel 24 contained therein. As shown in FIG. 1, the source 22 of fuel may be an underground fuel tank, such as that used at a retail gas station for instance. The fuel dispensing system 10 may further include a stand pipe extending into the fuel tank, a sump 26, various flow control and flow measurement devices (not shown) and a section of piping 28 that is mechanically and fluidicly coupled to valve 20. Valve 20 comprises a housing, or fluid conduit, 30 that may include first 32 and second 34 housings that are removably secured to one another by conventional means, such as fasteners 36 shown in FIG. 2. While the preferred embodiment described herein includes two separate housings 32, 34 coupled together, the invention is not so limited as the valve 20 may have a one-piece housing. The two-piece structure allows the second housing 34 (which has the shear groove) to be replaced without also replacing the first housing 32. In the illustrated embodiment, the first housing 32 is a lower housing and the second housing 34 is an upper housing. The terms upper and lower are used to describe embodiments and to facilitate understanding of the invention and does not limit the invention to a certain orientation. Fuel system 10 may further include a fuel dispensing unit 38 that may be mounted on a pedestal 40, which may be made of concrete and which in turn may be mounted on a surface, such as, for example, a concrete surface of a retail gas station. The lower housing 32 may be rigidly mounted within a sump 41 below or adjacent the pedestal 40.

The fuel dispensing system 10 may further include a rigid pipe or conduit 42 that may extend upwardly through the interior of the dispensing unit 38. Pipe 42 may be mechanically coupled, at a lower end, to the upper housing 34 of valve 20 and is in fluid communication with valve 20. Pipe 42 may also be in fluid communication with a flexible hose 44 that terminates in a nozzle 46 that is adapted for dispensing fuel into the fuel tank of a motor vehicle, such as an automobile, truck, etc.

Figure 2:
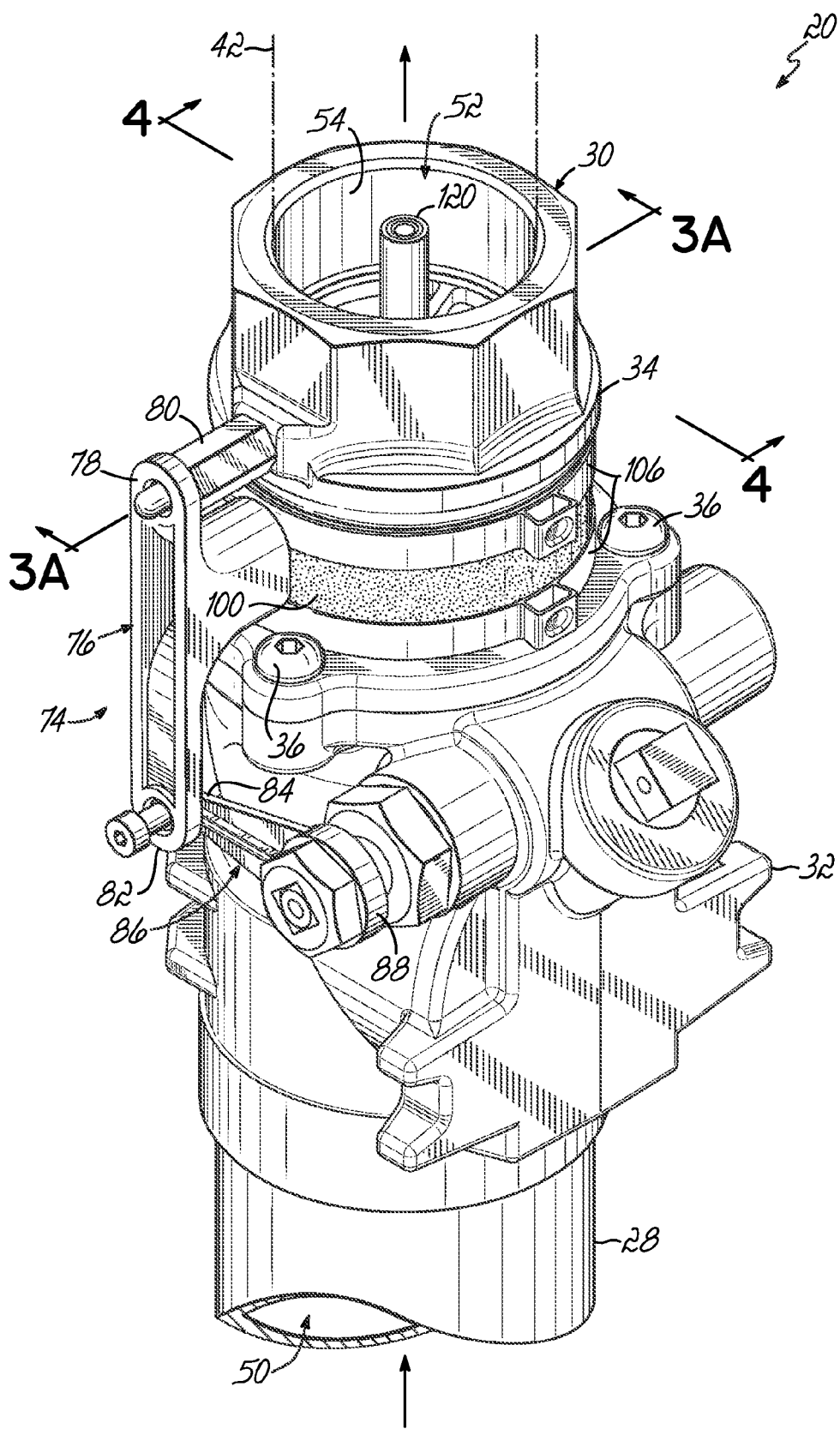
FIG. 2 is a perspective view of the emergency shutoff valve shown schematically in FIG. 1.
Figure 3A:
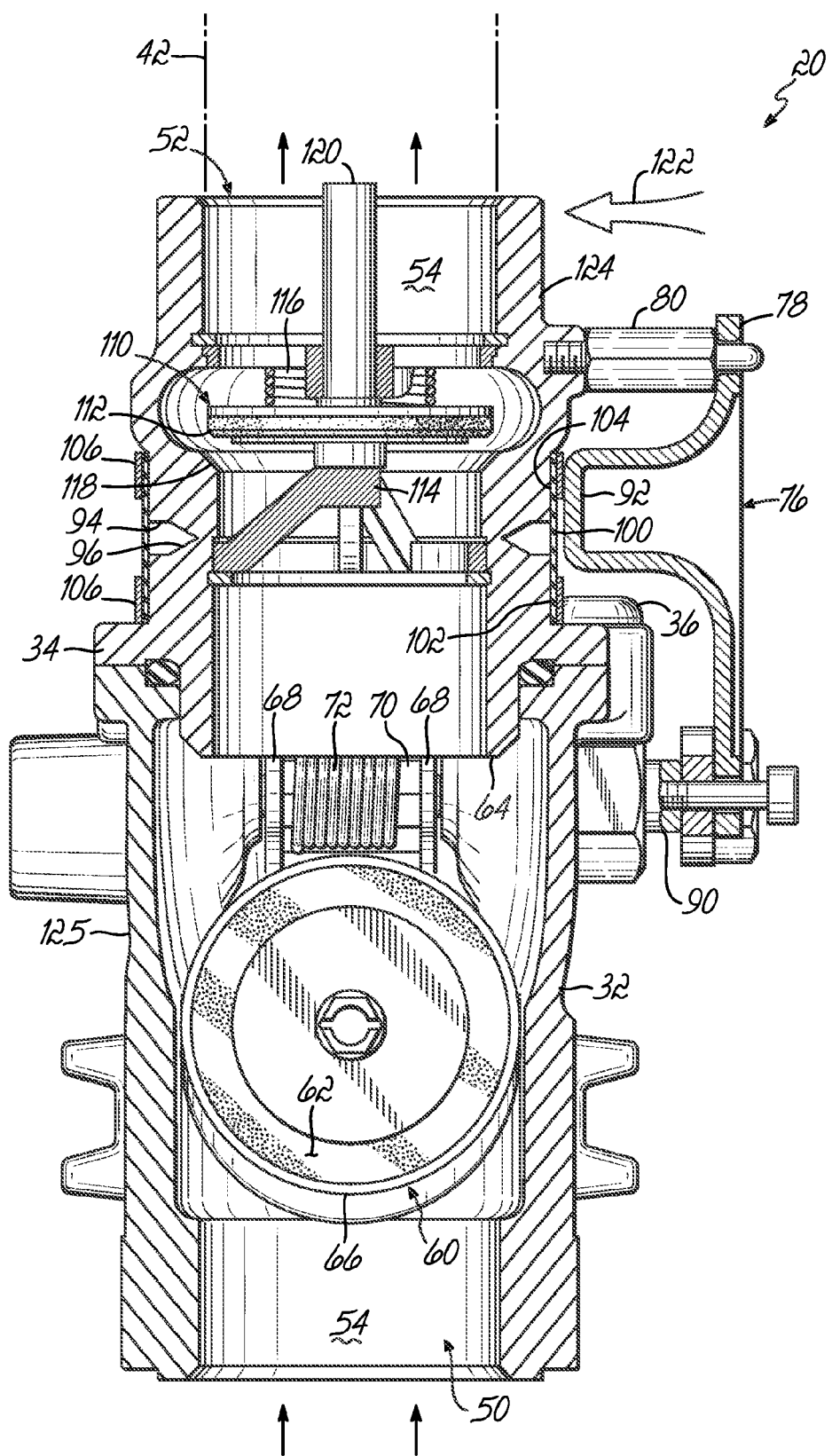
FIG. 3A is a cross-sectional view taken along line 3A-3A in FIG. 2, with a valve included in the lower housing shown in an open position.
Figure 3B:
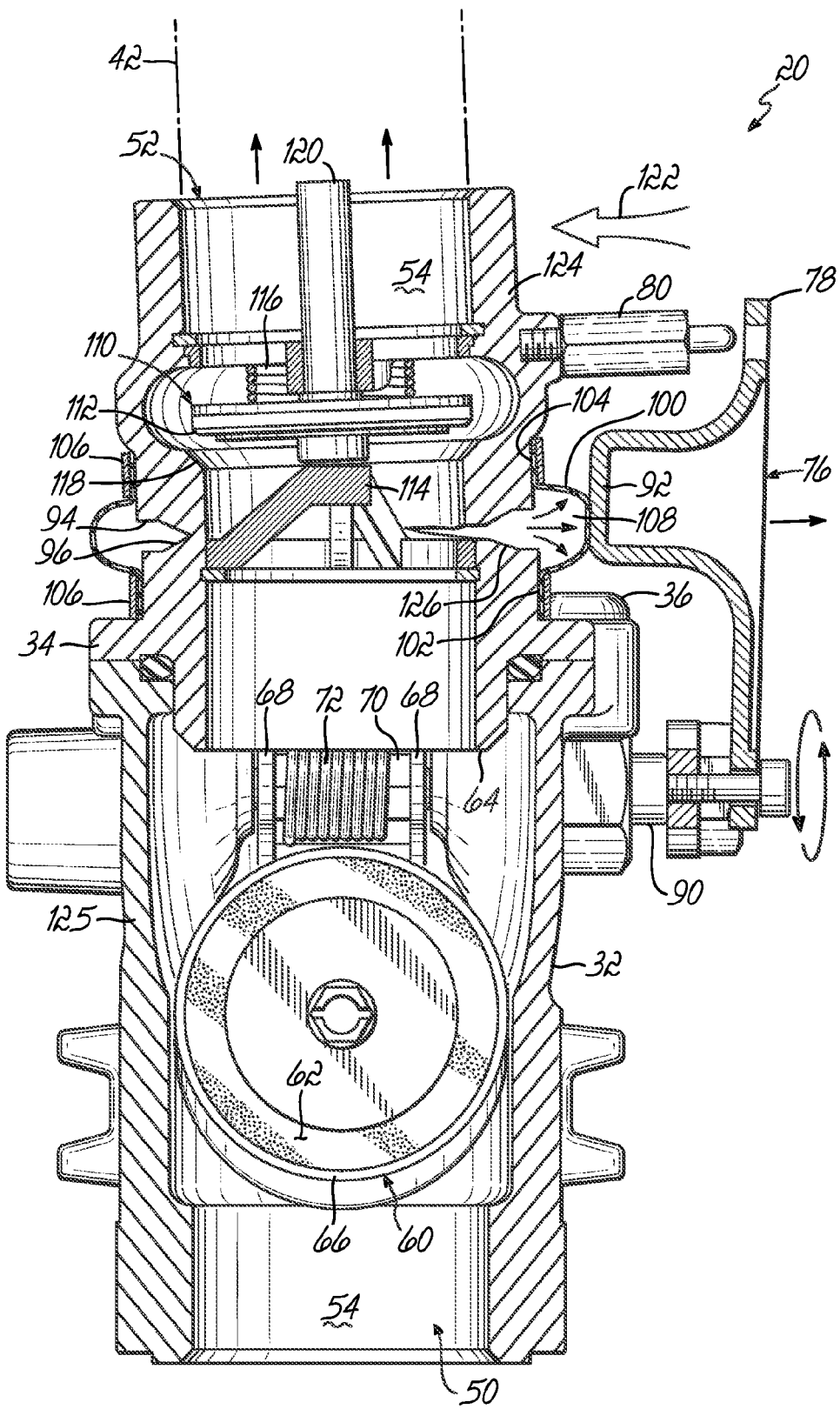
FIG. 3B is a cross-sectional view similar to FIG. 3A, but with a failure mode associated with a weakened portion of the emergency shutoff valve illustrated.
Figure 3C:
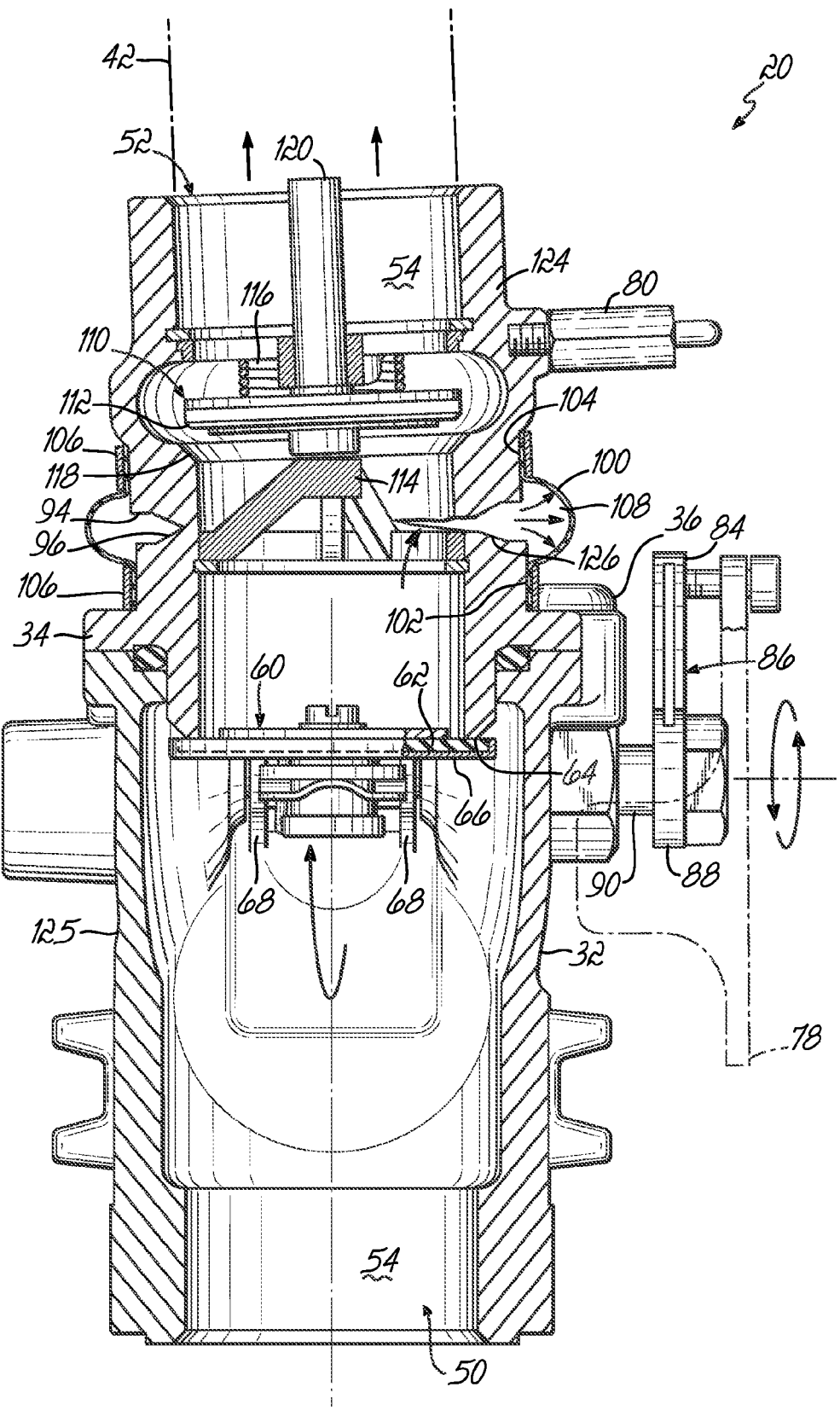
FIG. 3C is a cross-sectional view similar to FIGS. 3A and 3B, further illustrating the failure mode shown in FIG. 3B.
Figure 4:
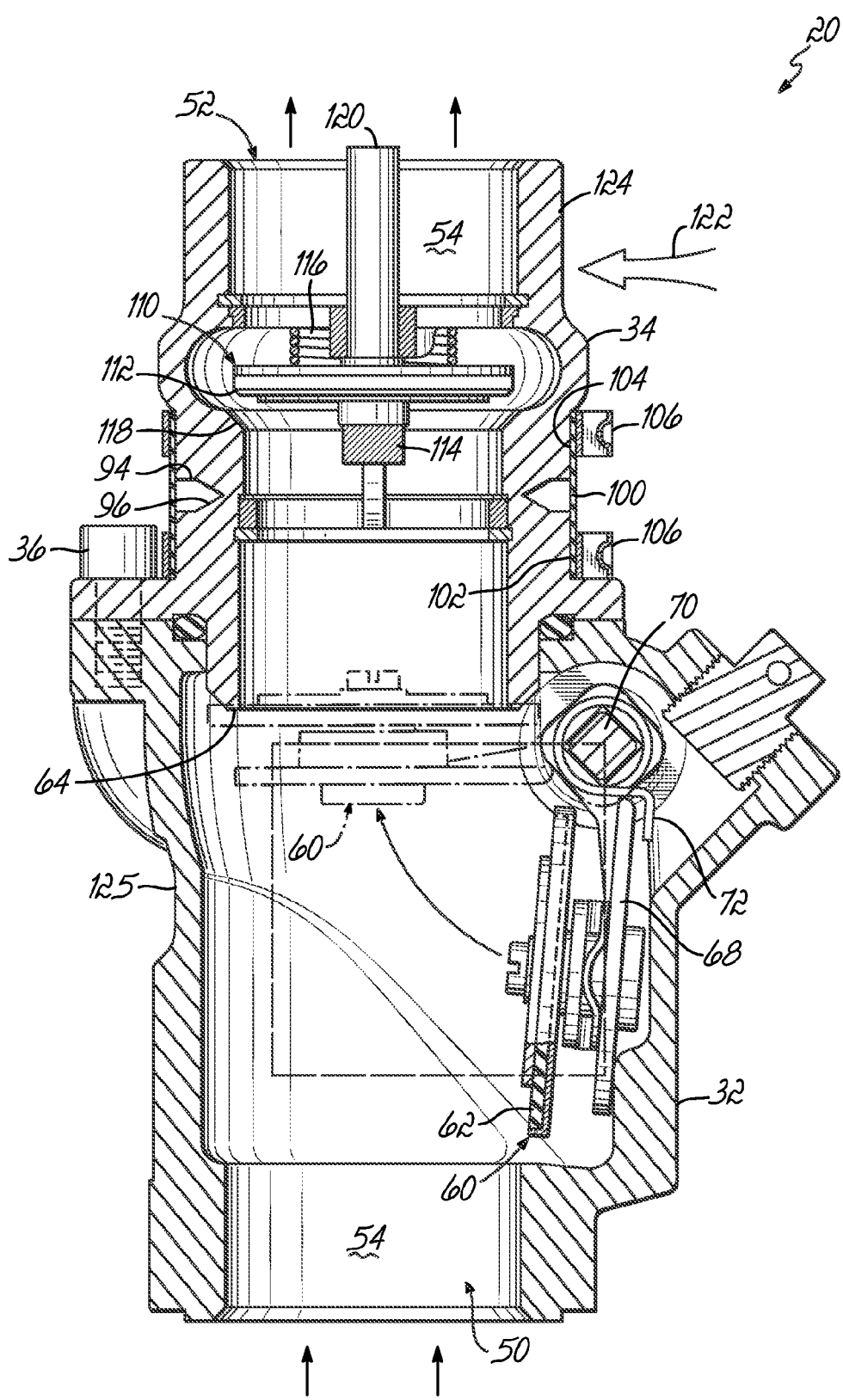
FIG. 4 is a cross-sectional view taken along line 4-4 in FIG. 2.

Referring now to FIGS. 2-4, housing 30 of valve 20 generally defines a fluid inlet 50, a fluid outlet 52 and a fluid flow passage 54 extending between the fluid inlet 50 and the fluid outlet 52. The fluid flow passage 54 may be suitable for the flow of pressurized fuel therein, such as fuel 24. The fuel 24 may be pressurized by a pump (not shown) included in the fuel dispensing system 10.

Valve 20 includes a valve member 60 that may be a flapper or butterfly type valve and which may be movably mounted within the lower housing 32. Valve member 60 includes a valve element 62 that is movable between an open position shown in FIGS. 3A, 3B and in solid line in FIG. 4, and a closed position shown in FIG. 3C and in phantom line in FIG. 4. In the closed position, the valve element 62, such as a sealing disk, may be disposed in sealing engagement with a valve seat 64 and is adapted to cut off or prevent fuel flow from the fluid inlet 50 to the fluid outlet 52. The valve element 62 may be supported by a structure, indicated generally at 66. Additional details of the structure 66 that can be used are found in U.S. Pat. Nos. 5,454,394; 5,193,569; and 5,099,870 that disclose conventional shear valves. Each of these patents is assigned to the assignee of the present invention and is expressly incorporated by reference herein in its entirety. The support structure 66 may include a pair of arms 68 having square openings that are received by a square section of a rotatable shaft 70, such that the valve element 62 and supporting structure 66 rotate with shaft 70. Valve element 62 and supporting structure 66 may be biased toward the closed position by a biasing member 72, which can be a torsion spring, coiled about the shaft 70. However, the valve element 62 and associated support structure 66 may be releasably latched in the open position by a latching mechanism indicated generally at 74 in FIG. 2. In the illustrated embodiment, latching mechanism 74 may be a linkage. However, latching mechanism 74 may be other devices suitable for releasably latching valve element 62 in the open position. During normal operation of valve 20, i.e., not during a failure mode of valve 20, the linkage 74 may be coupled to both the valve element 62 and to housing 30 as explained in more detail below.

Linkage 74 may include a first link 76 having a proximal end 78 coupled to housing 30. In the illustrated embodiment, this is accomplished by a pin 80 secured at one end to housing 30 and having an opposite end extending through an aperture formed in the proximal end 78 of first link 76. First link 76 further includes a distal end 82 that is coupled to a proximal end 84 of a second link 86 of linkage 74. A distal end 88 of second link 86 may be coupled to an end 90 (FIG. 3A) of the rotatable shaft 70 that projects outwardly from the housing 30. First link 76 may also include a protruding portion 92 that is disposed between the proximal 78 and distal 82 ends of first link 76 and is used for a subsequently discussed purpose.

The outer end 90 of the rotatable shaft 70 may include a cylindrical portion and the distal end 88 of second link 86 may include a circular aperture formed therein that engages the cylindrical portion of the outer end 90 of shaft 70. The distal end 88 of second link 86 may be secured to the outer end 90 of shaft 70 by soldering for instance, with the solder having a relatively low melting point. Accordingly, in the event of a fire surrounding valve 20, the solder can melt, allowing shaft 70 to rotate within second link 86, thereby causing the valve element 62 and supporting structure 66 to move from the open position shown in FIGS. 3A and 3B and in solid line in FIG. 4, to the closed position shown in FIG. 3C and in phantom line in FIG. 4, under the action of the biasing member 72. Alternatively, and in accordance with another embodiment of the invention, instead of the distal end 88 of the second link 86 being configured as a fusible hub that releases the valve element 62 in the event of a fire, as is conventional, the first link 76 may include a fusible section intermediate the proximal and distal ends 78, 82. Thus, in the event of a fire, the fusible section melts separating the end 78, 82 of the first link 76 and allowing the valve element 62 and supporting structure 66 to move to the closed position under the action of biasing member 72. Implementing the fusible section in the first link 76 may provide certain cost and manufacturing advantages as compared to the traditional placement of a fusible section in the distal end 88 of the second link 86.

Housing 30 includes a weakened, or frangible, portion 94 formed therein that is downstream of valve member 60. In the illustrated embodiment, upper housing 34 includes the weakened portion 94 formed therein, which extends circumferentially around a perimeter of the upper housing 34. The invention, however, is not so limited. The weakened portion 94 may be a groove and can have an inner portion 96 that is generally V-shaped, as shown in the illustrated embodiment. The invention is not so limited as those of ordinary skill in the art will recognize other configurations that define the weakened portion 94. The weakened portion 94 defines a predetermined fracture of failure site for various failure modes as subsequently discussed.

In an exemplary embodiment, valve 20 may further include an expansible member 100. The expansible member 100 may be a sleeve disposed in surrounding relationship with the weakened portion 94, as shown in the illustrated embodiment, and member 100 may be made of an elastomeric material. Suitable materials include fluro silicone rubber, BUNA-N rubber and fluro elastomer rubber. However, other materials may be used provided they exhibit sufficient resistance to ozone, to prevent dry rot, and are resistant to fuel corrosion. The expansible member 100 generally surrounds the weakened portion 94 and may be sealed to the upper housing 34 at a first location 102 upstream of the weakened portion 94 and at a second location 104 downstream of the weakened portion 94 so as to bound or encompass weakened portion 94. The expansible member 100 may be sealed to the upper housing 34 by a pair of band clamps 106 that extend around the perimeter of upper housing 34 or other suitable devices such as straps and the like. The expansible member 100 defines at least in part an expansible chamber 108 best seen in FIGS. 3B and 3C. The function of the expansible member 100 is subsequently discussed.

Valve 20 may optionally include a second valve member 110 disposed within the upper housing 34 of valve 20, downstream of the weakened portion 94. Valve member 110 may, for example, be a spring loaded poppet or check valve having a valve element 112 that may be a sealing disk. Valve member 110 may be normally open and held in the open position during operation of valve 20 by an abutment structure indicated generally at 114 that is secured to the upper housing 34. Other details of valve member 110 and the configurations of abutment structures 114 that may be used are more fully discussed in U.S. Pat. Nos. 5,454,394; 5,193,569; and 5,099,870 referenced previously, which disclose similar poppet valve and abutment structures. Alternatively, valve member 110 may be held in an open position during normal operation of valve 20 by the pressure of the fuel flowing within valve 20. Valve member 110 may be biased toward a closed position by a biasing member 116 that may, for example, be a coil spring. In the closed position, the valve element 112 is disposed in sealing engagement with a valve seat 118 formed in the upper housing 34. Valve member 110 may be forced closed by biasing member 116 in the event of certain failure modes, as subsequently discussed. Valve 20 may also optionally include a pressure relief valve (not shown) that can be disposed in a tubular stem 120 of valve member 110. The features of relief valves that may be used are discussed in the previously referenced patents. In any event, the pressure relief feature prevents a large pressure build up in the piping above the valve 20 on the occasion that the valve is sheared or separated.

Since the lower housing 32 of valve 20 is rigidly mounted within sump 41, when a predetermined load or force 122 is exerted on the housing 30 of valve 20 (shown as acting on upper housing 34, but load 122 could also act on lower housing 32) on either side of the weakened portion 94, either directly or indirectly, valve 20 can define a failure mode that depends on the value of force 122. The most common instance that may create a failure in the housing 30 is the inadvertent contact of a motor vehicle with the fuel dispensing unit 38 that houses pipe 42. However, a failure in housing 30 may result from any relative movement between portions of the housing 30 above and below weakened portion 94 caused by external forces including frost heave and other environmental conditions. In one failure mode, the force 122 is not sufficient to cause a first portion 124 of the housing 30 to substantially completely separate from a second remainder portion 125 of housing 30 along weakened portion 94 (valve shearing), but is sufficient to cause a crack 126 or other distress in housing 30, indicated in exaggerated form in FIGS. 3B and 3C, to emanate from the weakened portion 94 whereby the fluid flow passage 54 is in fluid communication with the expansible chamber 108 (valve cracking). Accordingly, in this failure mode, the structural integrity of housing 30 is compromised to an extent wherein the fuel flowing within passage 54 can escape from housing 30 through the weakened portion 94 and into the expansible chamber 108 under the fuel line pressure. This in turn causes the expansible member 100 to expand outwardly as shown in FIGS. 3B and 3C, as a result of the pressurized fuel entering chamber 108. Since the expansible member 100 is sealed to the upper housing 34, any fuel entering chamber 108 is retained therein, which prevents or reduces fuel from escaping from the valve 20 and thereby reduces the likelihood of environmental spills and the costs associated with the cleanup of such spills.

The protruding portion 92 of first link 76 may be disposed in relatively close proximity to the expansible member 100. Accordingly, when the member 100 expands outwardly, due to pressurized fuel entering expansible chamber 108, it contacts the protruding portion 92 of first link 76 so that first link 76 uncouples from at least one of the housing 30 and the second link 86. In the illustrated embodiment, the proximal end 78 of first link 76 disengages from the pin 80 secured to housing 30 as shown in FIGS. 3B and 3C so that first link 76 uncouples from housing 30. In other embodiments, first link 76 may be uncoupled from second link 86 or from both housing 30 and second link 86. When first link 76 is uncoupled from one or both of the housing 30 and second link 86, valve element 62 is unlatched from the open position and moves to the closed position as shown in solid line in FIG. 3C and in phantom line in FIG. 4 due to the action of biasing member 72. When valve element 62 is in the closed position, fuel is prevented from flowing from the fluid inlet 50 to the fluid outlet 52. Instead, fuel entering inlet 50 after valve element 62 is closed is retained within lower housing 32, thereby avoiding or reducing the likelihood of fuel spillage externally of housing 30.

When force 122 has a relatively higher value, the weakened portion 94 may define another failure mode (not shown herein) wherein the first portion 124 of housing 30 separates substantially completely from the second portion 125 of housing 30. In this valve shearing failure mode, the expansible member 100 does not prevent or otherwise inhibit such separation of the first portion 124 of housing 30 from the second portion 125 of the housing 30. Instead, the force 122 may cause the expansible member 100 to disengage from the housing 30 in a manner that permits the separation of the first and second portions 124, 125. The separation of the valve housings that do not include the expansible member in accordance with the invention, such as member 100, but are otherwise similar to valve 20, are illustrated in the foregoing referenced patents. In the event of this valve shearing failure mode, first link 76 would also be uncoupled from one or both of the housing 30 and second link 86, such that valve element 62 would move to the closed position under the action of biasing member 72 and the valve element 112 of the poppet or check valve 110 would also move to the closed position under the action of biasing member 116. Accordingly, when the valve element 42 moves to the closed position, fuel may be prevented from flowing through the lower housing 32 and externally of valve 20. Also, any fuel contained within the pipe 42 may be prevented from backflowing through the upper housing 34 and externally of valve 20. Accordingly, the likelihood of fuel spillage externally of valve 20 would be prevented or reduced.

Figure 5:
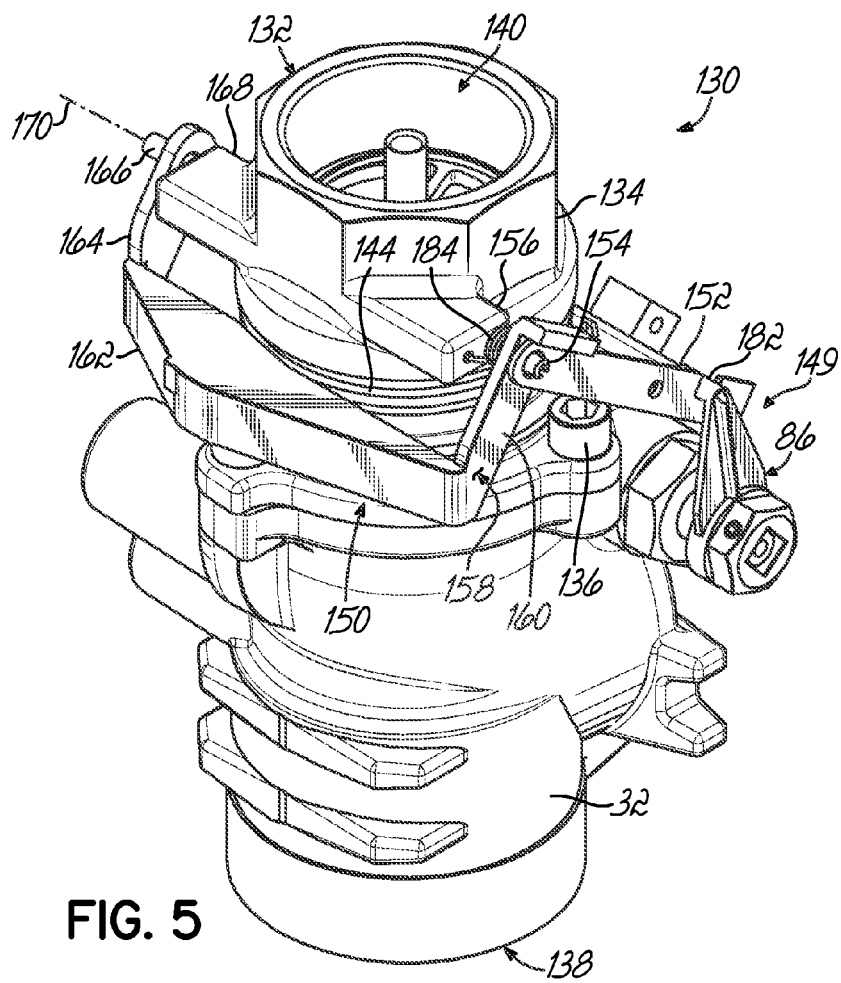
FIG. 5 is a perspective view of an emergency shutoff valve according to another embodiment of the present invention.
Figure 6A:
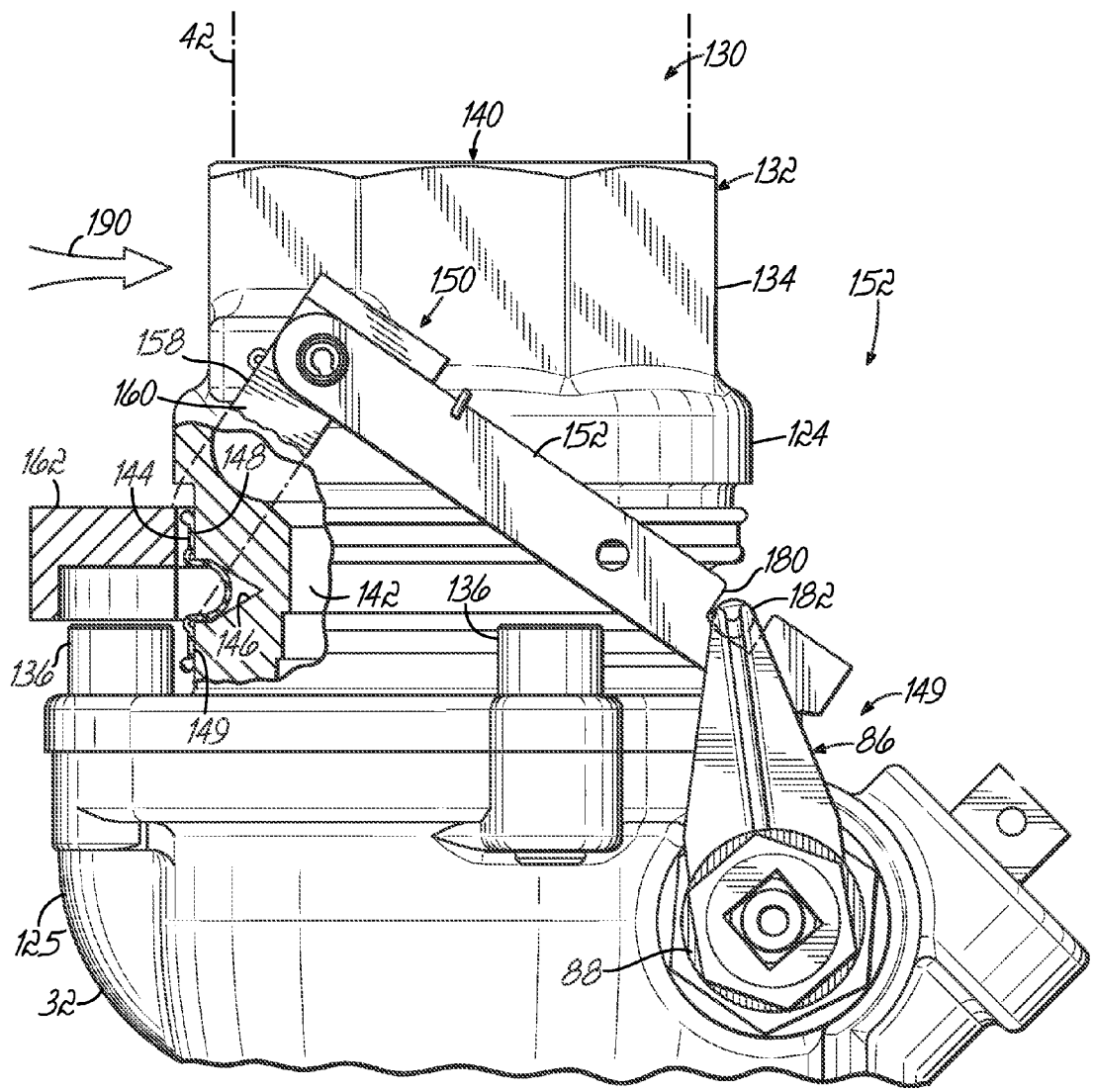
FIG. 6A is a cross-sectional view taken along line 6A-6A in FIG. 5 illustrating the included linkage of the shutoff valve in a position that latches a valve element (not shown in FIG. 6A) in the lower housing in an open position.
Figure 6B:
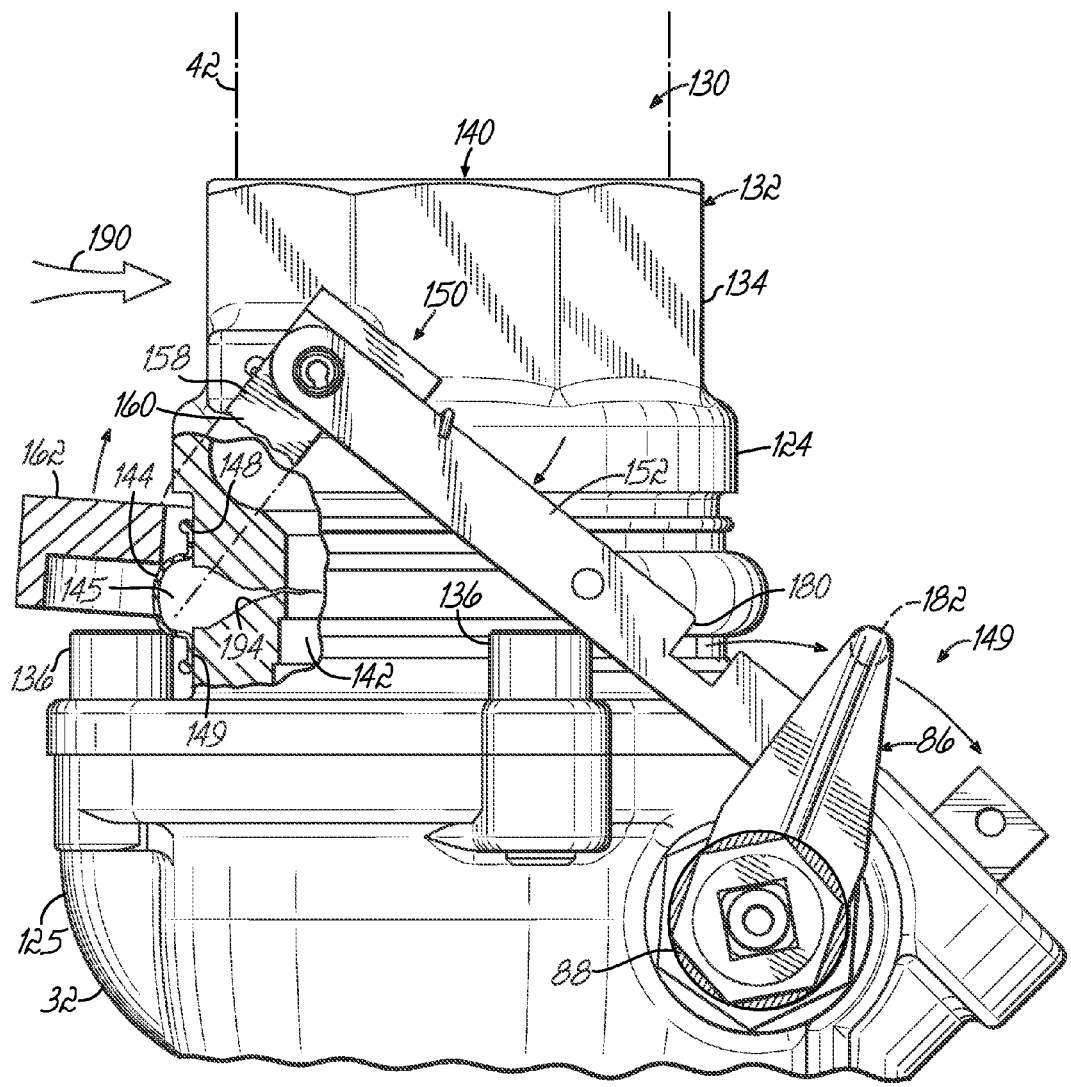
FIG. 6B is a cross-sectional view similar to FIG. 6A, but with the included linkage in a position that unlatches the valve element in the lower housing (not shown in FIG. 6B), allowing it to move to a closed position.

FIGS. 5, 6A and 6B, in which like reference numerals refer to like features in FIGS. 1-4, illustrate a valve 130 according to another embodiment of the invention. Valve 130 includes a housing, or conduit, 132 comprising an upper housing 134 and a lower housing 32. Upper housing 134 may be removably secured to lower housing 32 by conventional means such as fasteners 136. Again, while this embodiment is shown and described as a two-part housing, the invention is not so limited as a one-piece housing may also be utilized. Housing 132 defines a fluid inlet 138, a fluid outlet 140 and a fluid flow passage 142 (FIGS. 6A and 6B) extending between the fluid inlet 138 and the fluid outlet 140. The fluid flow passage 142 may be suitable for the flow of pressurized fuel therein, such as fuel 24.

Valve 130 may further include an expansible member 144, in lieu of expansible member 100, that defines an expansible chamber 145 (FIG. 6B) and is disposed in surrounding relationship with a weakened, or frangible, portion 146 formed in upper housing 134 and is sealed to the upper housing 134 at a first location 148 downstream of the weakened portion 146 and at a second location 149 upstream of the weakened portion 146. The weakened portion 146 may be a groove extending around a perimeter of upper housing 134 and may be generally V-shaped as shown in FIGS. 6A and 6B. The expansible member 144 may be a sleeve and may have a somewhat different configuration than the expansible member 100, as shown in FIGS. 6A and 6B. Expansible member 144 may be made of the same elastomeric materials discussed previously with regard to expansible member 100.

Valve 130 may include a latching mechanism, indicated generally at 149, which releasably latches the valve element 62, disposed in the lower housing 32, in the open position. In the illustrated embodiment, latching mechanism 149 may be a linkage. However, latching mechanism 149 may be other devices suitable for latching valve element 62 in the open position. During normal operation of valve 130, i.e., not during a failure mode of valve 130, linkage 149 may be coupled to both valve element 62 and housing 132. Linkage 149 may include a first link 150 having a first link portion 152 that is pivotally coupled to housing 132. The pivotal coupling of first link portion 152 to housing 132 may be achieved by a pin 154, or like member, which extends through first link portion 152 into an embossment 156 secured to upper housing 134. The first link 150 may further include a second link portion 158 also pivotally coupled to housing 132. In the illustrated embodiment, pin 154 passes through both of the first and second link portions 152, 158 and into embossment 156. Second link portion 158 includes a first arm 160 pivotally coupled to pin 154, a second arm 162 coupled to the first arm 160, and a third arm 164 that is coupled to second arm 162 and also pivotally coupled to the upper housing 132. Second arm 162 extends generally tangentially relative to upper housing 134 of housing 132 proximate the expansible member 144. The pivotal coupling of third arm 164 to housing 132 may be achieved by a pin 166, or like member, which extends through third arm 164 into an embossment 168 secured to upper housing 134. Pins 154 and 166 may be coaxially disposed so that first and second link portions 152 and 158 pivot together about a centerline axis 170 of pins 154 and 166, which may be separate pins or can be made as a one piece construction. Moreover, while second link portion 158 is shown and described as an integral member, i.e., the first, second and third arms 160,162, and 164 are integrally formed, those of ordinary skill in the art will recognize that the arms may be separate and then assembled to form second link portion 158.

As best seen in FIGS. 6A and 6B, first link portion 152 may include a notch 180 formed therein. Linkage 149 further includes the second link 86 as in valve 20 and discussed previously. Second link 86 may also include a pin 182 extending from second link 86 that is received in the notch 180 of first link portion 152. A biasing member 184, which may be a spring coiled about pin 154, biases the first link portion 152 toward a position wherein pin 182 is engaged in notch 180. For instance, in FIGS. 6A and 6B, the spring biases first link portion 152 in the counterclockwise position. In this position, valve element 62 of valve 60, disposed in lower housing 32 and illustrated and discussed previously with regard to valve 20 (not shown in FIGS. 5-6B), is latched in an open position.

Since the lower housing 32 of valve 130 is rigidly mounted within sump 41, when a predetermined force 190 is exerted on the housing 132 of valve 130 (shown as acting on upper housing 134, but load 190 could also act on lower housing 32) on either side of the weakened portion 146 either directly or indirectly, valve 130 can define a failure mode that depends on the value of force 190. The most common instance that may create a failure in housing 132 is the inadvertent contact of a motor vehicle with the fuel dispensing unit 38 that houses pipe 42. However, a failure in housing 132 may result from any relative movement between portions of the housing 132 above and below weakened portion 146 caused by external forces such as frost heave or other environmental conditions. In one failure mode, the force 190 is not sufficient to cause the first portion 124 of housing 132 to substantially completely separate from the second remainder portion 125 of the housing 132 along weakened portion 146 (valve shearing), but is sufficient to cause a crack 194 or other distress, indicated in exaggerated form in FIG. 6B, to emanate from the weakened portion 146 whereby the fluid flow passage 142 is in fluid communication with the expansible chamber 145 (valve cracking). Accordingly, in this failure mode, the structural integrity of housing 30 is compromised to an extent wherein the fuel flowing within passage 142 can escape from housing 132 through the weakened portion 146 and into the expansible chamber 145 under fuel line pressure. This in turn causes the expansible member 144 to expand outwardly as shown in FIG. 6B, as a result of the pressurized fuel entering chamber 145. Since the expansible member 144 is sealed with the upper housing 134, any fuel entering chamber 145 may be retained therein, which may prevent or reduce the likelihood of fuel spillage externally of valve 130.

The second arm 162 of second link portion 158 is disposed in relatively close proximity to the expansible member 144. Accordingly, when the expansible member 144 expands outwardly, due to pressurized fuel entering expandsible chamber 145, it contacts second arm 162 so that second link portion 158 rotates upwardly relative to the upper housing 134 and about axis 170. Due to the connection at pin 154, first link portion 152 rotates downwardly relative to upper housing 134 about axis 170, thereby disengaging pin 182 from notch 180. This rotation of first link portion 152 uncouples the first link portion 152 from second link 86, which is coupled to valve element 62 (shown and discussed previously with regard to valve 20; not shown in FIGS. 5, 6A and 6B). Accordingly, valve element 62 is unlatched from the open position and moves to a closed position (shown previously with respect to valve 20) within the lower housing 32 due to the action of biasing member 72. When valve element 62 is in the closed position, fuel is prevented from flowing from the fluid inlet 138 to the fluid outlet 140. Instead, fuel entering inlet 138 after valve element 62 is closed is retained within lower housing 32. Accordingly, the likelihood of fuel spillage externally of valve 130 may be reduced or prevented.

In the illustrated embodiment, valve 130 does not include the poppet or check valve 110. However, this may be optionally included in other embodiments. If poppet valve 110 is included, the poppet valve 110 may be moved to a closed position, as discussed previously with regard to valve 20 when a relatively larger predetermined load causes the housing 132 to substantially completely separate. The expansible member 144 does not prevent or otherwise inhibit this separation of the housing 132. Linkage 149 is also uncoupled from valve element 66 in this valve shearing failure mode, so that valve element 62 moves to the closed position under the action of biasing member 72. The poppet valve may also move to the closed position as discussed previously with respect to valve 20, if incorporated in valve 130.

Figure 7:
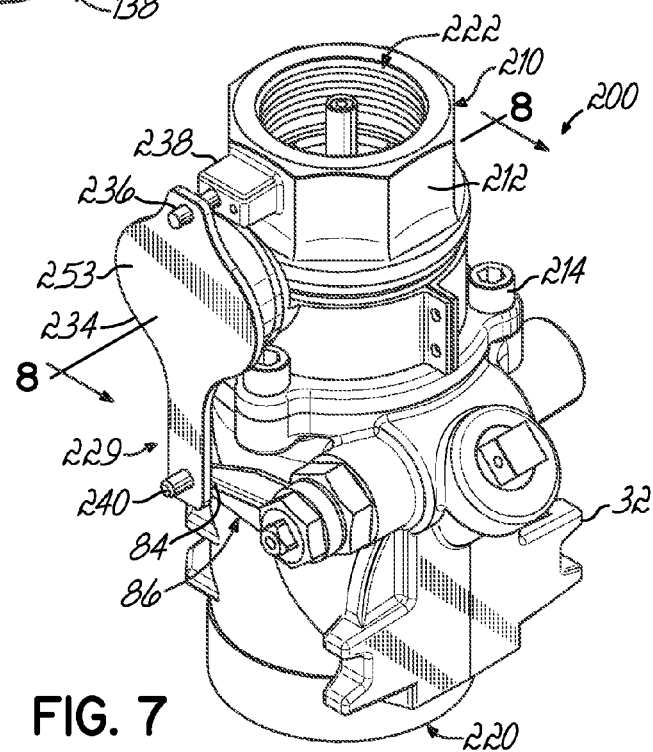
FIG. 7 is a perspective view of an emergency shutoff valve according to another embodiment of the present invention.
Figure 8:
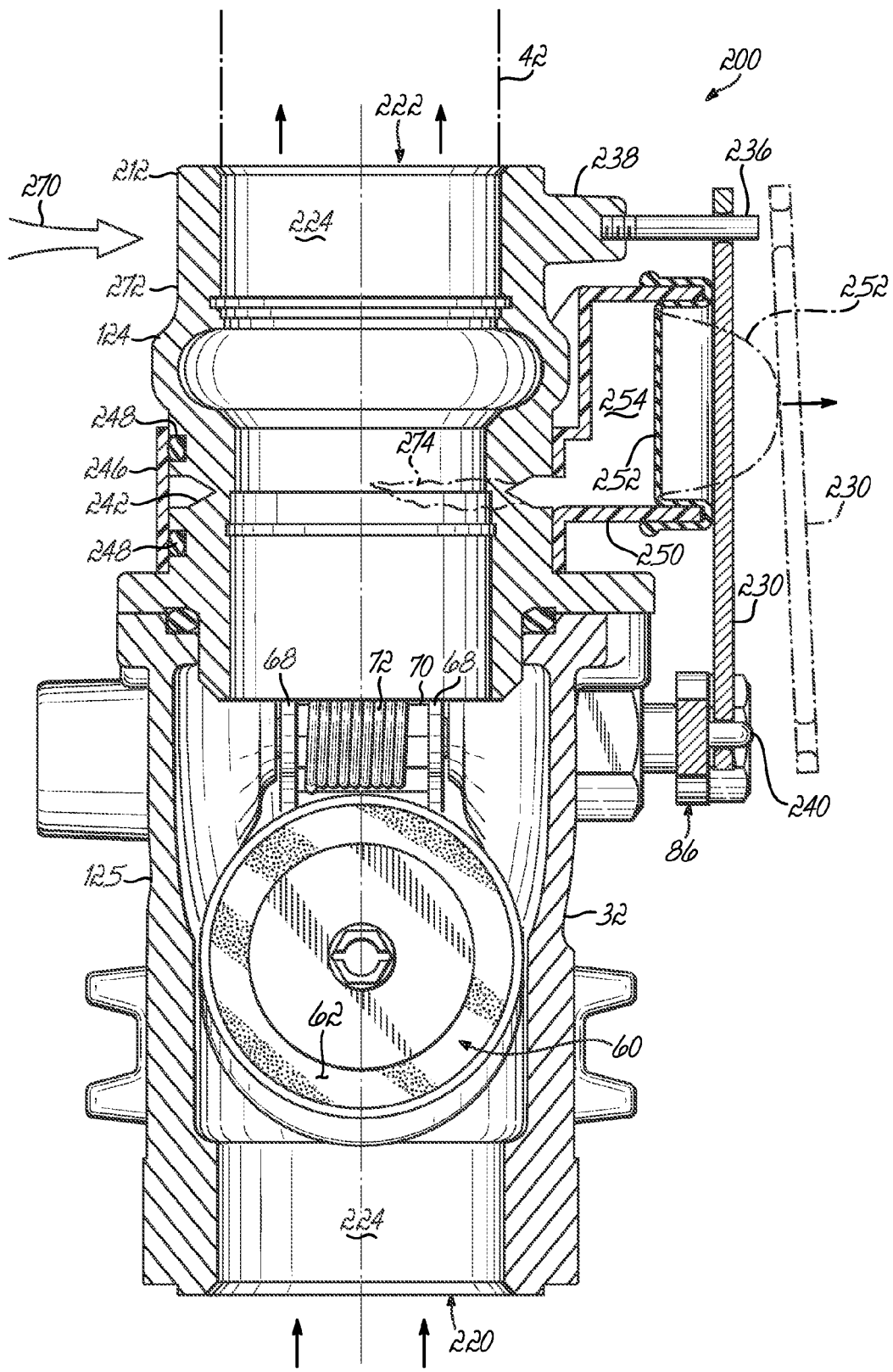
FIG. 8 is a cross-sectional view taken along line 8-8 in FIG. 7.

FIGS. 7 and 8, in which like reference numerals refer to like features in FIGS. 1-6, illustrate an emergency shutoff valve 200 according to another embodiment of the invention. Valve 200 comprises a housing 210 that includes the lower housing 32 as described for valves 20 and 130 and discussed previously, and an upper housing 212 that may be removably secured to the lower housing 32 by conventional means, such as bolts 214. The housing 210 may be a one-piece construction instead of the two-part construction described herein. Housing 210 of valve 200 defines a fluid inlet 220, a fluid outlet 222 and a fluid flow passage 224 extending between the fluid inlet 220 and the fluid outlet 222 as shown in FIG. 8. Fluid flow passage 224 may be suitable for the flow of pressurized fuel therein, such as fuel 24.

As with valves 20 and 130, the shutoff valve 200 includes a valve member 60 that can be a flapper or butterfly type valve that is movably mounted within the lower housing 32. Valve member 60 includes the valve element 62 that is movable between an open position and a closed position as illustrated and discussed previously with respect to valve 20. Valve element 62 may be biased toward a closed position by the biasing element 72 as discussed previously with respect to valve 20. When valve element 62 is in the closed position, fuel flow between fluid inlet 220 and fluid outlet 222 is prevented.

Shutoff valve 200 may include a latching mechanism indicated generally at 229 in FIG. 7, which releasably latches valve element 62 in the open position. In the illustrated embodiment, latching mechanism 229 may be a linkage. However, latching mechanism 230 may be other devices suitable for latching valve element 62 in the open position. During normal operation of valve 200, i.e., not during a failure mode of valve 200, linkage 229 may be coupled to both the valve element 62 and to housing 210. Linkage 229 may include a first link 230 and may also include the second link 86, as in valves 20,130 and discussed previously, which is coupled to valve element 62 in the same manner as discussed previously with respect to valve 20. First link 230 includes a proximal end coupled to housing 210. This can be accomplished by a pin 236 that passes through a proximal end of link 230 into an embossment 238 secured to the upper housing 212 of valve 200 as shown in the illustrated embodiment. A distal end of first link 230 may be coupled to second link 86. This may be accomplished by a pin 240 extending from the proximal end 84 of second link 85 that passes through the distal end of first link 230 as shown in the illustrated embodiment. The first link 230 latches the valve element 62 in an open position when the linkage 229 is coupled to both housing 210 and valve element 66.

Housing 210 may include a weakened, or frangible, portion 242 formed therein that is downstream of the valve element 62. In the illustrated embodiment, upper housing 212 may include the weakened portion 242 formed therein, which extends circumferentially around a perimeter of the upper housing 212. The invention, however, is not so limited. The weakened portion 242 may be a groove and may have an inner portion that is generally V-shaped, as shown in FIG. 8. The weakened portion 242 defines a predetermined fracture or failure site for various failure modes as subsequently discussed.

Valve 200 may further include an annular member 246 that partially circumscribes the upper housing 212 and may be sealed to the upper housing 212 at locations that are upstream and downstream of the weakened portion 242, which may be accomplished using O-rings 248, for example. Annular member 246 may be made of a variety of materials including plastics, metals and elastomeric materials. A hollow protruding member 250 may be formed integral with the annular member 246 and extends away from the upper housing 212. Valve 200 may further include an expansible member 252 that comprises a diaphragm in the illustrated embodiment that is disposed in sealing engagement with the protruding member 250. An upper portion 253 of first link 230 is disposed proximate the hollow protruding member 250. Expansible member 252 may be made of an elastomeric material such as the materials discussed previously with regard to the expansible member 100 of valve 20. The expansible member may also be inelastic but be formable so as to operate as a rolling diaphragm. Expansible member 252 defines at least a portion of an expansible chamber 254 that is disposed externally of housing 210, and more particularly is disposed externally of the upper housing 212. The expansible chamber 254 includes at least the space within the hollow protruding member 250 between the expansible member 252 and the upper housing 212. Depending upon the properties of the material used to make the annular member 246, the expansible chamber 254 may also include the space between the annular member 246 and the upper housing 212, including the space between the weakened portion 242 and annular member 246.

Since the lower housing 32 of valve 200 is rigidly mounted with sump 41, when a predetermined force 270 is exerted on the housing 210 of valve 200 on either side of the weakened portion 242, either directly or indirectly, valve 200 may define a failure mode that depends on the value of force 270. In one failure mode, the force 270 is not sufficient to cause a first portion 124 of housing 210 to substantially completely separate from a second remainder portion 125 of housing 210 along weakened portion 242 (valve shearing), but is sufficient to cause a crack 274 or other distress emanating from the weakened portion 242, indicated in exaggerated form in FIG. 8. In this failure mode, the fluid flow passage 224 is in fluid communication with the expansible chamber 254. Accordingly, in this failure mode, the structural integrity of housing 210 is compromised to an extent wherein the fuel flowing within passage 224 can escape from housing 210 through the weakened portion 242 and into the expansible chamber 254 under fuel line pressure. This in turn causes the expansible member 252 to expand outwardly as shown in phantom line in FIG. 8, as a result of the pressurized fuel entering chamber 254. Since the expansible member 252 is sealed to the upper housing 212, fuel entering chamber 254 is retained therein, which may prevent or reduce fuel from escaping from the upper housing 212 externally of valve 200.

The first link 230 of linkage 229 is disposed in relatively close proximity to the expansible member 252. Accordingly, when the expansible member 252 expands outwardly under fluid pressure it contacts first link 230 so that first link 230 moves outwardly as shown in phantom line in FIG. 8 and is uncoupled from housing 210 and second link 86. In other embodiments, it is possible for first link 230 to become uncoupled from only one of the housing 210 and second link 86. When first link 230 is uncoupled from one or both of the housing 210 and second link 86, valve element 62 may be unlatched from the open position and moves to the closed position, as discussed and illustrated previously with respect to valve 20. When valve element 62 is in the closed position, fuel is prevented from flowing from the fluid inlet 220 to the fluid outlet 222. Instead, fuel entering inlet 220 after valve element 62 is closed may be retained within lower housing 32, thereby preventing or reducing the likelihood of spillage of fuel externally of housing 210.

In the illustrated embodiment, valve 200 does not include the poppet or check valve 110 shown and discussed previously with regard to valve 20. However, valve 110 may be optionally included in other embodiments. If poppet valve 110 is included, the poppet valve 110 may be moved to a closed position, as discussed previously with regard to valve 20 when the load 270 has a relatively larger value, than that existing in the first failure mode, causing the first portion 124 of housing 210 to substantially completely separate from the second portion 125 of housing 210. The annular member 246, protruding member 250 and expansible member 252 do not significantly prevent such separation of the housing 210, i.e., they are not made of materials that would prevent such separation. In this event, the poppet valve 110 would move to the closed position as discussed previously, preventing or reducing the backflow of fuel from the dispensing unit through valve 110, thereby preventing or reducing the likelihood of spillage external of valve 200. Additionally, the first link 230 would be uncoupled from one or both of housing 210 and second link 86 in this valve shearing failure mode as well, so that valve element 62 would move to the closed position and stop the flow of fuel through valve 200.

Figure 9:
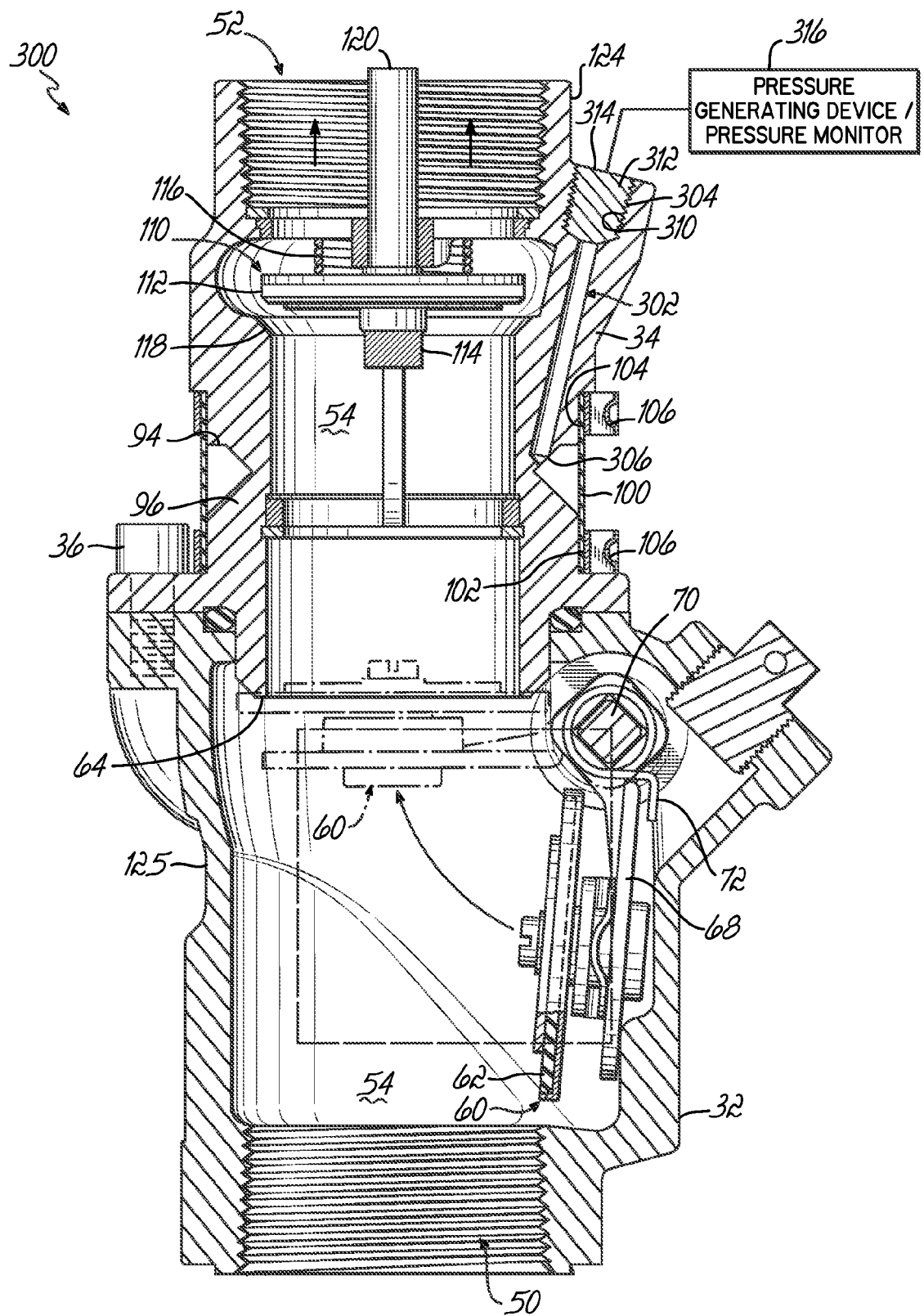
FIG. 9 is a cross-sectional view of an emergency shutoff valve according to another embodiment of the present invention.

FIG. 9 illustrates a valve 300 according to another embodiment of the invention. The valve 300 is similar in construction and operation to valve 20 shown in FIGS. 1-4 and described above, but for the inclusion of an access port 302. Accordingly, like reference numerals refer to like features in FIGS. 1-4, and only the additional feature will be described in detail. Moreover, although the access port 302 is shown and described in connection with the valve shown in FIGS. 1-4, the access port 302 may also be included in the valves shown in FIGS. 5-6B or FIGS. 7-8 as well. As shown in FIG. 9, the access port 302 includes an inlet 304, and outlet 306, and an open channel 308 extending between the inlet 304 and outlet 306. In an advantageous aspect, the outlet 306 of the access port 302 is in fluid communication with the expansible chamber 108 and the inlet 304 is accessible from outside of the valve 300. The inlet 304 may include an enlarged bore 310 having internal threads that cooperate with external threads on a removable plug 312 that fits within bore 310 to seal the access port 302 in an air tight and liquid tight manner. The plug 312 may include a bore, such as a hexagonal bore (not shown) in its outer surface 314 for engaging a tool (not shown) for rotating the plug 312 relative to the inlet 304 to engage/disengage the plug 312 therefrom.

The access port 302 provides a number of advantages to valve 300. For example, in one application the access port 302 may be used as a test port for checking the integrity of the expansible member 100 that encompasses weakened portion 94. In such an application, a positive or negative pressure generating device, such as a pressure pump or a vacuum pump, and shown schematically at 316, may be coupled to the inlet 304 for generating positive or negative pressure within the expansible chamber 108. Once the selected pressure is achieved in the expansible chamber 108, the pressure will be monitored over a specified period of time. To this end, the pressure generating device 314 may include a pressure monitor for monitoring the pressure in the expansible chamber 108 via the access port 302. Alternately, a separate pressure monitor may be operatively coupled to the inlet 304 for monitoring the pressure.

In any event, if the pressure in the expansible chamber 108 changes by a threshold amount over the selected time interval, such change may be indicative of a leak or tear in the expansible member 100. By way of example, the expansible chamber 108 may be positively pressurized (relative to atmosphere) up to pressure just under the pressure that would otherwise cause the valve to close. For example, the chamber 108 may be pressurized up to approximately 5 psi. The pressure may then be monitored for between approximately 20 seconds and 120 seconds. If the pressure drops or decreases by approximately 10% of the initial pressure then a leak may exist in the expansible member 100 and it may be replaced. In another embodiment, a negative pressure (relative to atmosphere) may be imposed in the expansible chamber 108 of up to 5 psi vacuum pressure. The pressure may then be monitored for between approximately 20 seconds and 120 seconds. If the pressure jumps or increases by approximately 10% of the initial vacuum pressure then a leak may exist in the expansible member 100 and it may be replaced. The testing pressure, test time interval, and threshold pressure change may depend on the specific application. Those of ordinary skill in the art will appreciate that these values may be selected so as to detect a leak in the expansible member 100 or along the upper and lower seals to the housing 30 with a relative high degree of accuracy.

The pressure check performed on the expansible member 100 may be conducted manually or by an automated control system normally associated with fuel dispensing systems, such as that shown in FIG. 1. Thus, in one embodiment, a service station worker may access the valve 300 and remove the plug 314 from the inlet 304 as described above. The worker may then use a pressure generating device, such as a hand held device as is generally known in the art, to positively or negatively pressurize the expansible chamber 108. The pressure within the chamber 108 may then be monitored over a pre-determined time period. Once the test is completed, the plug 314 may be reinserted into inlet 304 and the access port 302 sealed. If the pressure changes by the pre-determined threshold amount, the expansible member 100 may be replaced. Such a manual check may be performed on the valve 330 at desired intervals. For example, the pressure checks may be performed daily, weekly, monthly, just a few times a year, or at other desired time intervals.

In an alternate embodiment, the inlet 302 may be operatively coupled to a suitable pump, pressure monitor and other electronic control system components. These components may be already incorporated into the fuel dispensing system and modified to conduct the pressure test, or the components may be dedicated components specifically for performing the tests. At pre-determined time intervals (e.g., daily, weekly, monthly, yearly, etc), which may be input through the control, a pressure test may be conducted and the results communicated to the control for processing. The control would determine if the threshold pressure change has been reached within the time period for the test. If so, then the control can notify an operator that the pressure test has failed indicating that the expansible member 100 should be replaced. In addition, the control may automatically shut down the fuel carrying conduit line until a successful pressure test is conducted.

In another application, the access port 302 may be used to facilitate assembly of the valve 300. For example, during assembly, and as the expansible member 100 is being coupled to the housing 30 of the valve 300, such as by the band clamps 106 or other straps, it may be desirable to remove the air from the expansible chamber 108. Thus, a vacuum pump may be coupled to the inlet 304 of access port 302 and a vacuum pulled to remove the air in chamber 108. In this way, the expansible member 100 may be collapsed or sucked in toward the housing 30 so as to essentially follow the contour of the housing 30. This minimizes the initial size of the expansible chamber 108 so that the valve 300 reacts more quickly to any crack or shear of the valve 300 as explained above. Pulling the vacuum during assembly may also allow for more reliable sealing of the expansible member 100 to the housing 30 above and below the weakened portion 94. In addition to these, the access port 302 may provide other advantages. For instance, as discussed below, the access port 302 may provide a path for inserting a self-expanding material into the expansible chamber 108.

Figure 10A:
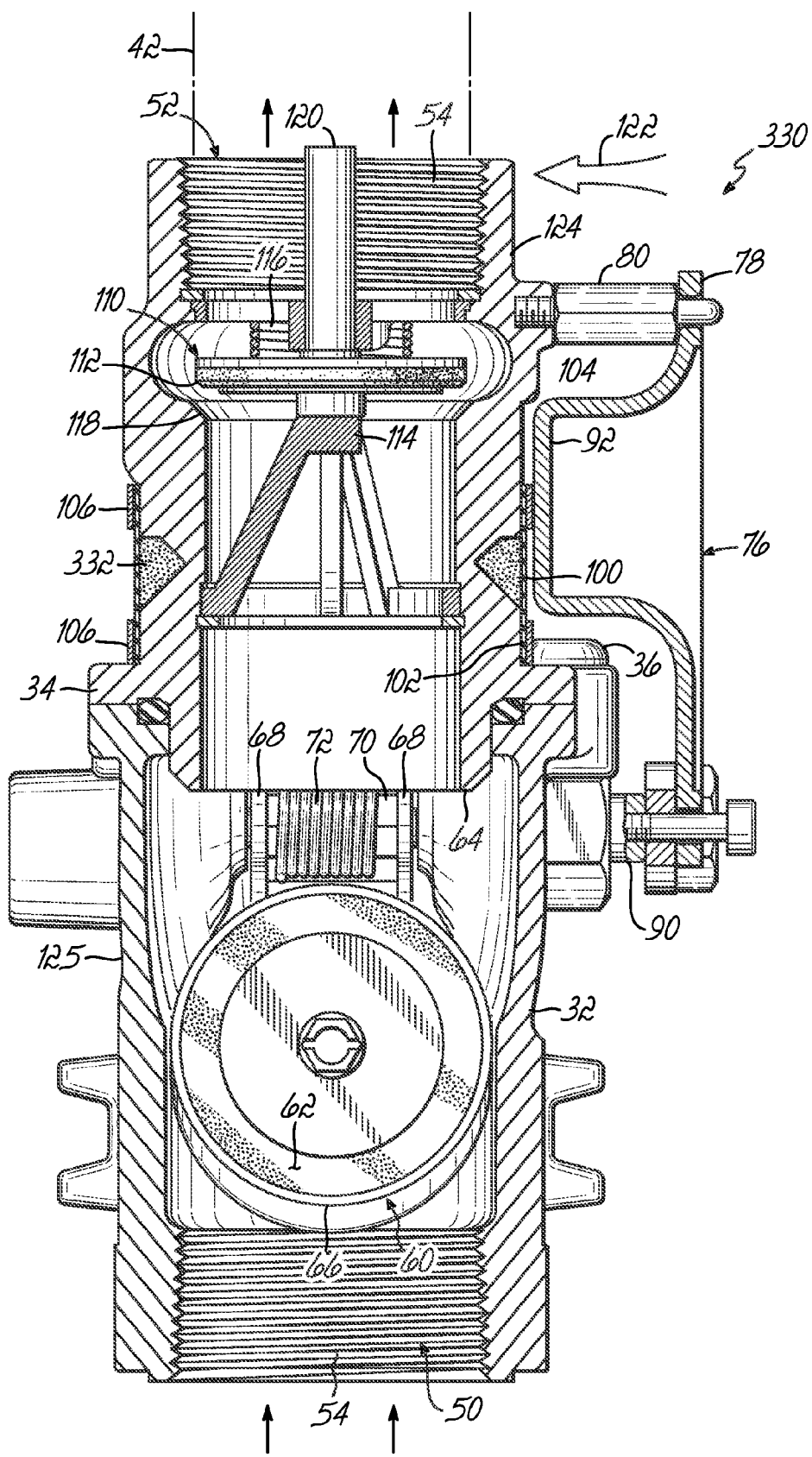
FIG. 10A is a cross-sectional view of an emergency shutoff valve according to yet another embodiment of the present invention.
Figure 10B:
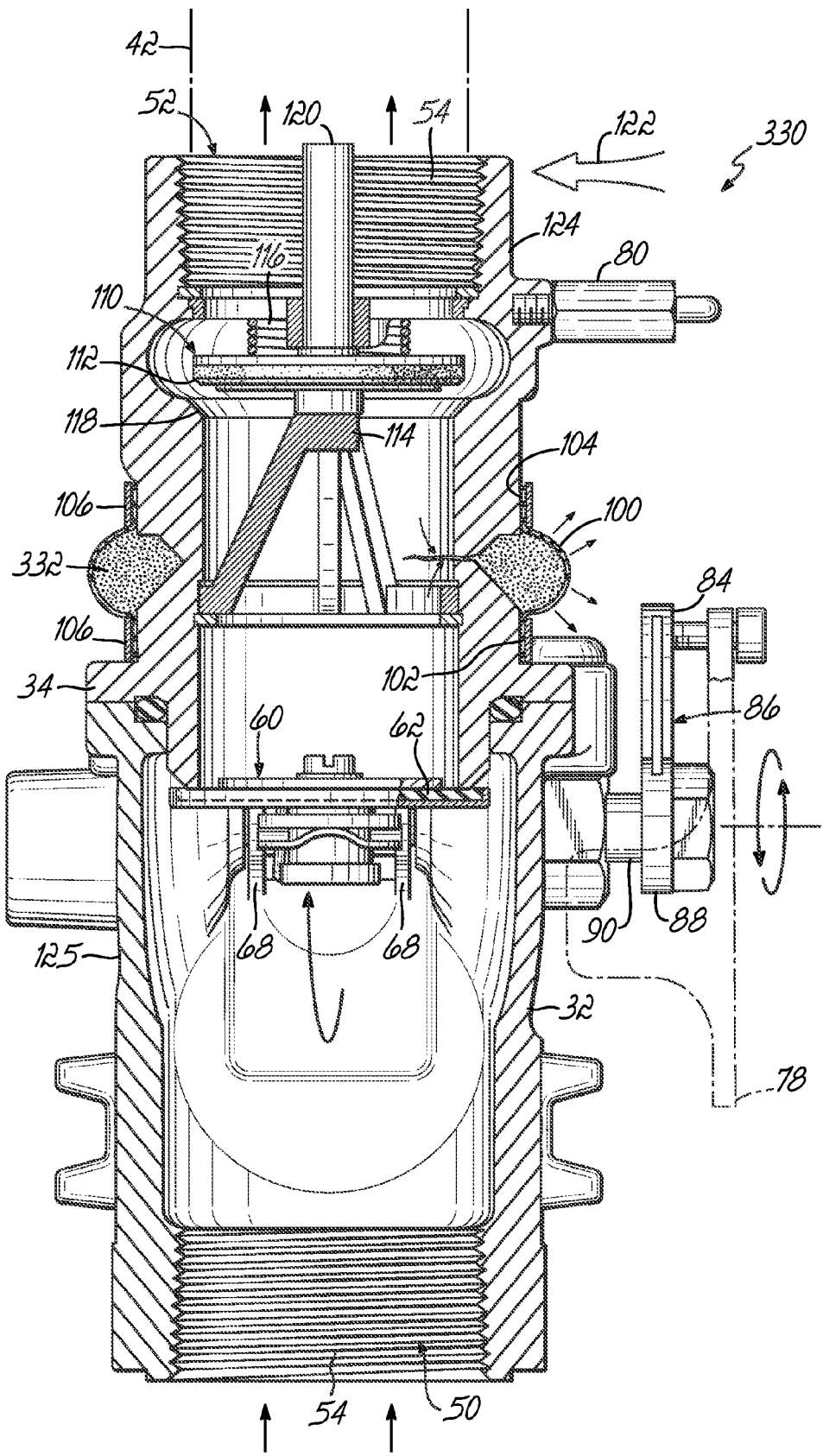
FIG. 10B is a cross-sectional view similar to FIG. 10A, but with a failure mode associated with a weakened portion of the emergency shutoff valve illustrated.

FIGS. 10A and 10B illustrate yet another embodiment of a shutoff valve in accordance with the invention. Valve 330 is similar in construction and operation to valve 20 shown in FIGS. 1-4 and described above, but for the inclusion of a self-expanding material disposed in the expansible chamber 108. Accordingly, in these figures like reference numerals refer to like features in FIGS. 1-4, and only the additional feature will be described in detail. Moreover, although the self-expanding material is shown and described in connection with the valve shown in FIGS. 1-4, the material may also be included in the valves shown in FIGS. 5-6B or FIGS. 7-8 as well. As shown in FIG. 10A, an expandable material 332 at least partially, and preferably completely, fills the expansible chamber 108. The expandable material 332 is configured so that in a dry state, it has a first volume, and in a wet state it has a second volume greater than the first volume. In other words, when at least a portion of the expandable material 332 comes into contact with certain liquid mediums (e.g., fuels), such as would occur if the valve 330 cracked, the material 332 would start expanding.

In addition, the expandable material 332 may also be configured such that as the material 332 expands, it generates a sufficient pressure within the expansible chamber 108 to expand the expansible member 100 outwardly. As explained above, as the expansible member 100 expands outwardly, it contacts the protruding portion 92 of first link 76 so that first link 76 uncouples from at least one of the housing 30 and the second link 86 to move the valve element 62 to the closed position. Expandable materials which could operate as material 332 include but are not limited to alkylstyrene copolymers, such as those available as Imbiber Beads offered by Imbtech America, Inc. of Midland, Mich. Moreover, the expandable material 332 may be disposed in the expansible chamber 108 during assembly thereof. Alternately, and as noted above, the expandable material 332 may be introduced into the expansible chamber 108 through access port 302 on those embodiments incorporating such an access port 302. In one embodiment, the expansible member 100 and the expansible chamber 108 may be eliminated and the expandable material 332 disposed about the weakened portion 94, such as by bonding or other means known in the art, so as to close the valve on the occasion the valve is cracked. Although in such an embodiment, fuel may escape from the valve, the expandable material 332 is capable of shutting down the valve thereby reducing the amount, if any, of fuel leaking to the environment.

Disposing expandable material 332 in expansible chamber 108 or about weakened portion 94 provides a number of advantages to valve 330. By way of example, if the pressure in the conduit line, which operates as the "motive force" for shutting off the valve 20 described above, were suddenly lost after the valve 330 were cracked or sheared, then the expandable material 332 would provide the motive force for uncoupling the first link 76 from the housing 30 and moving the valve element 62 to the closed position. Thus, even under a lost pressure condition, the valve 330 would be capable of shutting off and thereby prevent the flow of fuel through the valve 330. Another advantage provided by disposing material 332 in expansible chamber 108 is to seal relatively small leaks in the expansible member 100 or leaks along the seals formed with the housing 30 above and below the weakened portion 94. To this end, as the material 332 expands, small holes or openings in expansible member 100 or along the upper and lower seals with housing 30 would become partially or completely occluded with the expanding material 332. Fuel that would otherwise have escaped through the holes or openings has now been prevented or reduced due to the presence of the expandable material 332. Moreover, the expandable material 332 ensures that even in the event of holes or openings in the expansible member 100 or along the upper and lower seals, which might otherwise prevent the expansible member 100 from actuating the valve member 60, the valve 330 will be shutoff due to the ability of the material 332 itself, and independent of the fuel conduit line pressure, to generate a sufficient pressure to actuate the valve member 60.

The various embodiments of the emergency shutoff valve as disclosed herein generally have a housing with a weakened portion and an expansible member defining at least a portion of an expansible chamber in surrounding relationship to the weakened portion. The expansible member may be operatively coupled to a valve member in the shutoff valve to close the flow of fuel through the valve when the expansible member is actuated. The valves disclosed herein provide certain advantages over existing shear valves. In particular, in the unlikely situation of a failure mode that cracks the valve without substantially completely shearing the valve, the valve according to embodiments of the invention prevent or reduce the likelihood of fuel spillage that would otherwise occur with existing shutoff valves. In addition, this benefit is attained by using the fuel line pressure itself and/or the expansion of a material in the expansible chamber or disposed about the weakened portion as the motive force for closing off the valve in such a valve cracking failure mode. Thus, no additional energy or energy consuming components must be supplied to the shutoff valve to actuate the valve to a closed position. The valves may include an access port that allows the expansible member to be periodically tested or that facilitates assembly of the valves. The shutoff valves according to the invention then provide additional benefits relative to conventional valves in a low cost manner to achieve these benefits.

While the foregoing description has set forth various embodiments of the present invention in particular detail, it must be understood that numerous modifications, substitutions and changes can be undertaken without departing from the true spirit and scope of the present invention as defined by the ensuing claims. The invention is therefore not limited to specific embodiments as described, but is only limited as defined by the following claims.

What is claimed is:

1. An emergency shutoff valve comprising:
   a housing having a weakened portion to define a predetermined failure site;
   an expandable material defining a definite shape disposed about the weakened portion, wherein the expandable material is capable of expanding from a first volume to a second volume greater than the first volume; and
   a valve member, wherein said expandable material is operatively coupled to said valve member to close the valve member when said expandable material is expanded to the second volume.

2. An emergency shutoff valve as recited in claim 1, further comprising:
   an expansible member at least partially surrounding said weakened portion to define an expansible chamber therebetween, wherein the expandable material is disposed in the expansible chamber.

3. An emergency shutoff valve as recited in claim 1, wherein the expandable material expands from the first volume to the second volume when at least a portion of the material is contacted by a liquid.

4. An emergency shutoff valve as recited in claim 1, wherein said expandable material is an alkylstyrene copolymer.

5. An emergency shutoff valve comprising:
   a fluid conduit;
   a frangible area defined in said conduit;
   a valve member operably connected to said conduit upstream of said frangible area;
   an expansible chamber, said frangible area being disposed in said expansible chamber;
   a movable member defining at least a portion of said expansible chamber;
   an access port having an inlet, an outlet, and a channel extending between said inlet and outlet, said outlet in fluid communication with said expansible chamber; and
   a linkage operably coupled to said movable member and said valve member for shutting said valve upon movement of said movable member in response to leakage of fluid through said frangible area.

6. An emergency shutoff valve as recited in claim 5, further comprising:
   a removable plug insertable into said inlet for sealing off the access port.

7. An emergency shutoff valve as recited in claim 5, further comprising:
   an expandable material disposed in the expansible chamber.

8. An emergency shutoff valve as recited in claim 7, wherein said expandable material is an alkylstyrene copolymer.

9. An emergency shutoff valve for use in a fuel dispensing system comprising:
   a housing defining a fluid inlet, a fluid outlet and a fluid flow passage extending between said fluid inlet and said fluid outlet, said fluid flow passage being suitable for the flow of fuel therein, said housing further having a weakened portion that defines a predetermined failure site;
   a valve element movable between an open position and a closed position, said closed position preventing fuel flow from said fluid inlet to said fluid outlet;
   a latching mechanism coupled to said valve element, said latching mechanism releasably latching said valve element in said open position; and
   an expandable material disposed about the weakened portion, wherein the expandable material is capable of expanding from a first volume to a second volume greater than the first volume;
   said emergency shutoff valve defines a failure mode wherein the structural integrity of said housing is compromised to an extent wherein fuel can escape from said housing through said weakened portion so as to contact said expandable material when a predetermined load is applied to said housing, said expandable material expanding from the first volume to the second volume when contacted by the fuel; and
   said expandable material is operable, upon occurrence of said failure mode, for releasing said latching mechanism so that said valve element moves from said open position to said closed position.

10. An emergency shutoff valve as recited in claim 9 further comprising:
    an expansible member at least partially surrounding said weakened portion to define an expansible chamber therebetween, wherein said expandable material is disposed in said expansible chamber.

11. An emergency shutoff valve as recited in claim 9, wherein said expandable material is an alkylstyrene copolymer.

12. An emergency shutoff valve for use in a fuel dispensing system comprising:
    a housing defining a fluid inlet, a fluid outlet and a fluid flow passage extending between said fluid inlet and said fluid outlet, said fluid flow passage being suitable for the flow of fuel therein;
    a valve element movable between an open position and a closed position, said closed position preventing fuel flow from said fluid inlet to said fluid outlet;

a latching mechanism coupled to said valve element, said latching mechanism releasably latching said valve element in said open position;

an expansible member defining at least a portion of a sealed expansible chamber external of said housing; and an access port having an inlet, an outlet, and a channel extending between said inlet and outlet, said outlet in fluid communication with said expansible chamber, wherein said housing comprises a weakened portion disposed downstream of said valve element, said expansible member being sealed to said housing at a first location upstream of said weakened portion and at a second location downstream of said weakened portion;

said emergency shutoff valve defines a failure mode wherein the structural integrity of said housing is compromised to an extent wherein fuel can escape from said housing through said weakened portion and into said expansible chamber when a predetermined load is applied to said housing; and said expansible member is operable, upon occurrence of said failure mode, for releasing said latching mechanism so that said valve element moves from said open position to said closed position.

13. An emergency shutoff valve as recited in claim 12, further comprising:

a removable plug insertable into said inlet for sealing off the access port.

14. An emergency shutoff valve as recited in claim 12, further comprising:

an expandable material disposed in the expansible chamber.

15. An emergency shutoff valve as recited in claim 14, wherein said expandable material is an alkylstyrene copolymer.

* * * * *